US008095479B2

(12) United States Patent
Sekiai et al.

(10) Patent No.: US 8,095,479 B2
(45) Date of Patent: Jan. 10, 2012

(54) PLANT CONTROL APPARATUS AND METHOD HAVING FUNCTIONS OF DETERMINING APPROPRIATE LEARNING CONSTRAINT CONDITIONS

(75) Inventors: Takaaki Sekiai, Hitachi (JP); Satoru Shimizu, Hitachi (JP); Eiichi Kaminaga, Hitachinaka (JP); Akihiro Yamada, Toukai-mura (JP); Yoshiharu Hayashi, Hitachinaka (JP); Naohiro Kusumi, Hitachinaka (JP); Masayuki Fukai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1210 days.

(21) Appl. No.: 11/624,416

(22) Filed: Jan. 18, 2007

(65) Prior Publication Data

US 2007/0203862 A1    Aug. 30, 2007

(30) Foreign Application Priority Data

Feb. 28, 2006  (JP) .................................. 2006-053671
Mar. 29, 2006  (JP) .................................. 2006-091672

(51) Int. Cl.
*G06F 15/18* (2006.01)
(52) U.S. Cl. ............................. 706/12; 700/31; 700/286
(58) Field of Classification Search .................... 706/16; 700/31, 286
See application file for complete search history.

(56) References Cited

U.S. PATENT DOCUMENTS

| 5,448,681 A  * | 9/1995 | Khan ............................... 706/23 |
| 6,415,273 B1 | 7/2002 | Fujime ............................ 706/16 |
| 7,107,107 B2 * | 9/2006 | Morikawa et al. ............... 700/31 |

FOREIGN PATENT DOCUMENTS

| JP | 06266404 | 9/1994 |
| JP | 08276354 | 10/1996 |
| JP | 10254504 | 9/1998 |
| JP | 11231907 | 8/1999 |
| JP | 2000-035956 | * 2/2000 |
| JP | 2002304211 | 10/2002 |
| JP | 2004116351 | 4/2004 |

OTHER PUBLICATIONS

"Robust Model Following Control Systems of No-minimum Phase Discrete-time Systems using Approximate System", A Publication of Electronics, Information and Systems Society, The Transactions of The Institute of Electrical Engineers of Japan, vol. 121-C, No. 11, Nov. 2001, pp. 2-12.

* cited by examiner

*Primary Examiner* — Jeffrey A. Gaffin
*Assistant Examiner* — Mai T Tran
(74) *Attorney, Agent, or Firm* — Brundidge & Stanger, P.C.

(57) ABSTRACT

There is provided a control apparatus including a function of generating an operation signal applied to a control subject and a model that simulates characteristics of the control subject, a function of receiving an evaluation value signal calculated based on a measurement signal obtained by applying the operation signal to the control subject and the model, and a function of learning to generate the operation signal such that an expected value of the sum of the evaluation value signals obtained from a present state to a future state is either maximum or minimum in which the evaluation value signal calculated based on the measurement signal from the model is calculated by adding a first evaluation value obtained based on a deviation between the measurement signal obtained from the model and a setpoint value, and a second evaluation value obtained based on a difference in characteristics between the model and the control subject.

25 Claims, 21 Drawing Sheets

FIG. 12

| | | Increment Rate | Decrement Rate |
|---|---|---|---|
| Generation Output Constant Operation | Coal Type A | 1.5 | -1.5 |
| | Coal Type B | 1.2 | -1.2 |
| Generation Output Varying Operation | | 0.5 | -0.4 |
| Burner Switching Operation | | 0.1 | -0.1 |
| Coal Type Switching Operation | | 0.0 | 0.0 |

Control Parameter Setting Screen

Input RL (Rate Limiter) Parameters

Save    Cancel

| | Increment Rate | | Decrement Rate | | Upper Limit | | Lower Limit | |
|---|---|---|---|---|---|---|---|---|
| | RL | Spec | RL | Spec | LL | Spec | HL | Spec |
| Operation End A | 1.5 | 2.5 | -1.5 | 2.5 | 90 | 100 | 0 | 0 |
| Operation End B | | | | | | | | |
| ... | | | | | | | | |

| | Increment Rate | Decrement Rate | Upper Limit | Lower Limit |
|---|---|---|---|---|
| Operation End A | 1.5 | -1.5 | 90 | 0 |
| Operation End B | | | | |
| ... | | | | |

PLANT CONTROL APPARATUS AND METHOD HAVING FUNCTIONS OF DETERMINING APPROPRIATE LEARNING CONSTRAINT CONDITIONS

CROSS REFERENCES TO RELATED APPLICATIONS

The present invention contains subject matter related to Japanese Patent Application JP 2006-053671 filed in the Japanese Patent Office on Feb. 28, 2006, Japanese Patent Application JP 2006-91672 filed in the Japanese Patent Office on Mar. 29, 2006 and the entire contents of which being incorporated herein by reference.

BACKGROUND OF THE INVENTION

The present invention relates to a control apparatus and a control method suitable for controlling a thermal electric power plant or the like.

In recent years, unsupervised learning methods such as a reinforcement learning method have extensively been researched. "Reinforcement learning" is known as a framework of "learning to control" that provides a method of learning to generate operation signals for working on an environment such that measurement signals obtained from the environment will be desirable via an interactive operation in trial and error with an environment such as a control subject.

In reinforcement learning, a method of generating operation signals relative to an environment is learned such that the expected value of the evaluated values obtained between the present state and the future state is the highest or lowest value based on scalar quantity (called a "reward" in the reinforcement learning field) calculated from measured signals obtained from the environment. As examples of a method of implementing the learning function, algorithms such as Actor-Critic, Q-learning, and Real-Time Dynamic Programming described in the Non-Patent Document 1 have been known.

As a framework of a further elaborated reinforcement learning method, "Dyna-architecture" is reviewed in the above-described literature. The framework involves preliminarily learning what operation signals to generate based on a model that simulates a control subject, and determining which operation signals to apply to the control subject based on the learned result. The framework also includes means for adjusting a model using the operation signals for the control subject and the measured signals such that the occurrence of an error between the control subject and the model can be reduced.

Further, a technology to which the reinforcement learning is applied is disclosed in the Patent Document 1. This technology includes a method of determining which operation signals to apply to the control subject by the following steps: preparing a plurality of reinforcement learning modules each including a model and a system having a learning function; calculating responsibility signals each having a value such that the smaller the prediction error between the model and the control subject, the greater value the module may include; and weighting operation signals in proportion to the responsibility signals for the control subject generated from each of the reinforcement learning modules.

A plant control apparatus computes measured signals obtained from a plant of a control subject to figure out the operation signals for applying to the control subject. The control apparatus incorporates algorithms to compute the operation signals such that the measured signals of the plant can achieve the operation target.

As an example of a control algorithm used for controlling the plant, a PI (proportion-integral) control algorithm can be given. In the PI control, the operation signals to output from the control apparatus for controlling the plant may be figured out by adding a value obtained from time-integrating a deviation between an operation setpoint value and the measured signals of the plant to a value obtained from multiplying the deviation between the operation setpoint value and the measured signals of the plant by a proportional gain. Alternatively, the operation signals for controlling the plant in the control apparatus may be obtained using the learning algorithms.

Japanese Unexamined Patent Publication No. 2000-35956 describes a technology regarding an agent learning apparatus as a method of computing the operation signals for controlling the plant in the control apparatus using a learning algorithm.

A technology regarding a method using Dyna-architecture is described in a technical literature "Reinforcement Learning" (from pp. 247 to 253).

In the methods according to these technologies, since a control apparatus includes a model for predicting characteristics of a control subject and a learning unit for preliminary learning to generate a model input such that a model output as a predicted outcome of the model can achieve a model output target, the control apparatus can generate operation signals supplied to the control subject in accordance with the learned result by the learning unit.

If there is an error between the model and the control characteristics of the control subject, the control apparatus corrects the model using the measured signals obtained from the outcome of operating the control subject and re-learns which operation signals to generate based on the corrected model.

[Non-Patent Document 1] "Reinforcement Learning", translated by Sadayoshi Mikami and Masaaki Minagawa, published by Morikita Publishing Co., Ltd. on Dec. 20, 2000.

[Patent Document 1] Japanese Unexamined Patent Publication NO. 2000-35956

In the methods according to these technologies, since a control apparatus includes a model for predicting characteristics of a control subject and a learning unit for preliminary learning to generate a model input such that a model output as a predicted outcome of the model can achieve a setpoint of a model output, the control apparatus can generate operation signals supplied to the control subject in accordance with the result acquired by the learning unit.

Further, if there is a significant difference in the characteristics between the control subject and the model, the operation signals that is effective to the model may not necessarily be effective to the control subject. Hence, the control subject may not appropriately be controlled.

SUMMARY OF THE INVENTION

Therefore, the present invention intends to provide a control technology by which a control subject can safely be operated in the early stage of learning. An embodiment of the present invention also includes a control technology in which operation signals are not generated in a region where the characteristics between a control subject and a model are different, but rather are generated in a specific region where characteristics between the control subject and the model are similar.

When a control apparatus attempts to learn to generate operation signals using the method described in the Patent Document 1 and the Non-Patent Document 1, it is necessary to determine constraint conditions in learning. For example, since an operation speed of an operation end of the plant in the control subject is varied with an operational range produced by one operation, the learned result may also be varied accordingly.

Thus, it may be necessary for the learning constraint conditions to have pertinent setting based on the information on the operation speed of the operation end.

However, it is difficult to set such learning constraint conditions in advance. The plant is controlled and operated with a plurality of operation ends of the control apparatus and hence the variability in the actual operation speeds of the operation ends is frequently observed though the operation ends have the identical design specification. Further, it is probable that the operation ends deteriorate due to aging and, hence, reduce the operation speeds.

When variability or deterioration is observed in the operation speed of the operation end, desired control results may not be obtained though the operation signals generated in compliance with a method acquired from the learned model input are applied to the plant of the control subject.

The present invention intends to provide a plant control apparatus and a plant control method having functions of determining appropriate learning constraint conditions such that the plant can properly be controlled in a case where the variability in the operation speeds is frequently observed between the plurality of the operation ends, or in a case where the operation speeds deteriorate due to aging of the operation ends.

In order to solve the above-described problems, embodiments of the present invention adopt the following means.

According to an embodiment of the present invention, there is provided a control apparatus including a function of generating an operation signal applied to a control subject and a model that simulates characteristics of the control subject, a function of receiving an evaluation value signal calculated based on a measurement signal obtained by applying the operation signal to the control subject and the model, and a function of learning to generate the operation signal such that an expected value of the sum of the evaluation value signals obtained from a present state to a future state is either maximum or minimum; in which the evaluation value signal calculated based on the measurement signal from the model is calculated by adding a first evaluation value obtained based on a deviation between the measurement signal obtained from the model and a setpoint value, and a second evaluation value obtained based on a difference in characteristics between the model and the control subject.

According to an embodiment of the present invention, there is provided a plant control apparatus including an operation signal generating unit for calculating an operation signal directing a control instruction that is applied to a plant using a measurement signal indicating plant operation state quantity, a model for simulating control characteristics of a plant as a control subject, a control logic database in which control logic data including control parameters used by the operation signal generating unit for calculating an operation signal are stored, an operation end specification database in which operation end specification data of an operation end for controlling plant state quantity are stored, an operation signal database in which previous operation signals are stored, a measurement signal database in which previous measurement signals are stored, a learning condition determining unit having a function of determining an initial value of a learning parameter using data stored in the control logic database and the operation end specification database and a function of updating the learning parameter using data stored in the control logic database, the operation signal database and the measurement signal database, a learning unit for setting a limit value of an operation signal range per unit time included in learning parameters to a learning constraint condition and learning to operate the plant using the model and a learning information database in which learning information data acquired at the learning unit are stored, in which the operation signal generating unit includes a learning signal generating unit for calculating a plant operation signal using a measurement signal indicating operation state quantity of the plant and learning information data stored in a learning information database.

According to another embodiment of the present invention, there is provided a plant control method of calculating an operation signal directing a control instruction supplied to a plant using a measurement signal indicating plant operation state quantity for controlling the plant including the steps of forming a model simulating control characteristics of a plant indicating a control subject by the control apparatus of the plant;

storing control logic data including control parameters used for calculating the operation signal in a control logic database of the control apparatus;

storing operation end specification data of an operation end for controlling plant state quantity in an operation end specification database;

storing previous operation signals in an operation signal database;

storing previous measurement signals in a measurement signal database;

determining an initial value of a learning parameter by using data stored in a control logic database and an operation end specification database;

updating a learning parameter using data stored in the control logic database, the operation signal database and the measurement signal database;

setting a limit value of an operation signal range per unit time contained in the learning parameter to a constraint condition and using said model to simulate plant characteristics to learn a plant operation method; and storing learning information data indicating learned results in the learning information database, in which an operation signal directing a control instruction applied to the plant is calculated using the measurement signal indicating the plant operation state quantity and the learning information data stored in the learning information database.

Since the embodiments of the present invention include the above-described configurations, a method of generating the operation signal can be learned in the region having a small model error. Therefore, the control subject can safely be operated in the early stage of learning.

According to an embodiment of the present invention, it is possible to realize a plant control apparatus and a plant control method having functions of determining appropriate learning constraint conditions such that the plant can properly be controlled when variability in the operation speeds is fre-

BRIEF DESCRIPTION OF THE DRAWINGS

FIG. 12 is a diagram illustrating a control parameter setting screen in the plant control apparatus shown in FIG. 8;

DESCRIPTION OF THE PREFERRED EMBODIMENTS

Figure 1:
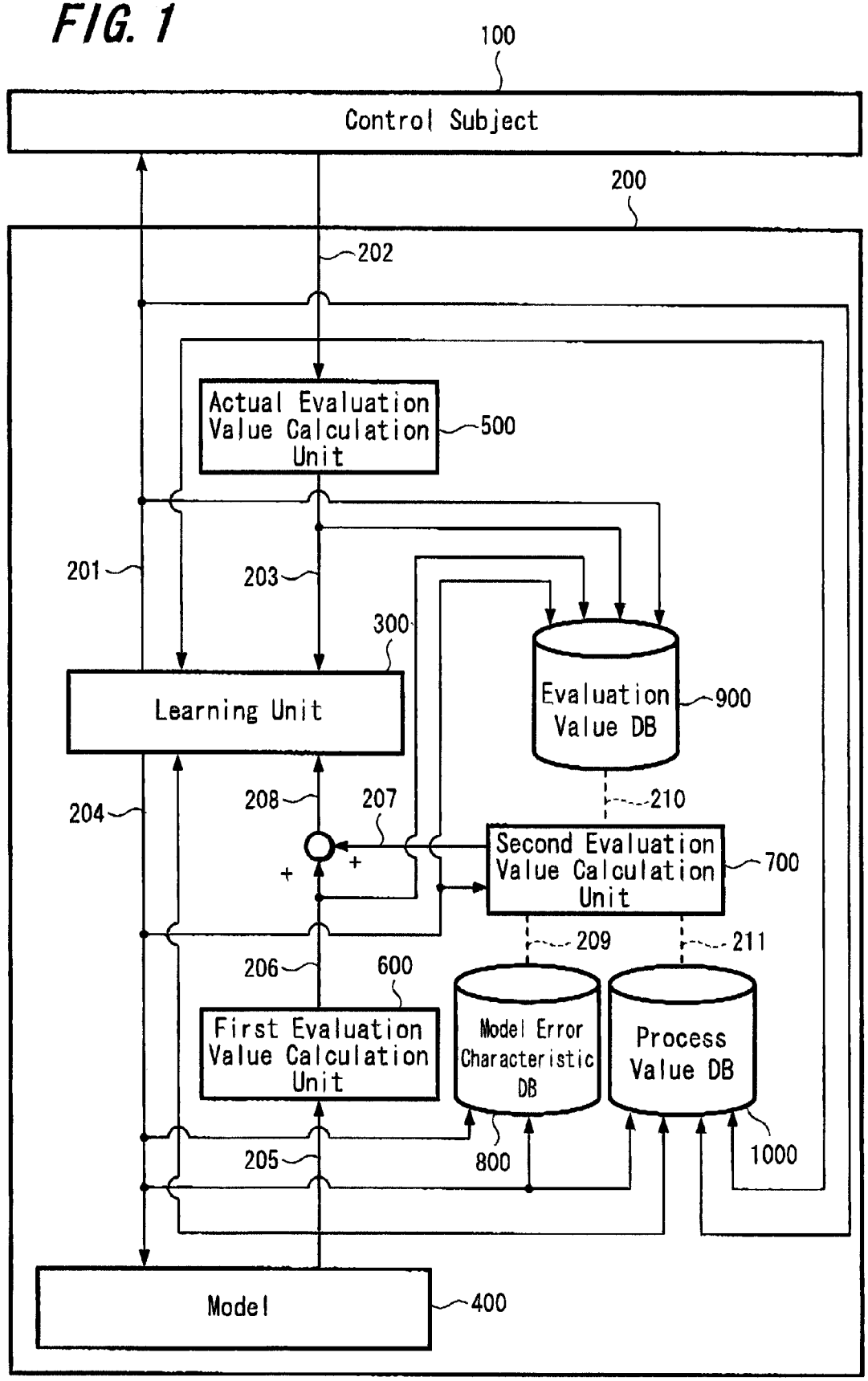
FIG. 1 is a functional block diagram illustrating an example in which a control apparatus according to an embodiment of the present invention is applied to a control subject.

A control apparatus and a control method according to embodiments of the present invention will be described with reference to the drawings. FIG. 1 of the accompanying drawings is a functional block diagram illustrating an example in which a control apparatus 200 according to an embodiment of the present invention is applied to a control subject 100.

As shown in FIG. 1, a control apparatus 200 includes a learning unit 300. The learning unit 300 generates an operation signal 201 to apply to the control subject 100. The learning unit 300 also receives a measurement signal 202 from the control subject 100 and an actual evaluation value signal 203 outputted from an actual evaluation value calculating unit 500 to which the measurement signal 202 is inputted. It should be noted that the learning unit 300 has a function of learning a method of generating the operation signal 201 so that the total of expected values of the actual evaluation value signal 203 from the present state to the future state will be maximum (or minimum).

The actual evaluation value calculating unit 500, for example, has a function of outputting the actual evaluation value signal 203 such that the closer to a desired value the measurement signal 202, the larger the value of the measurement signal 202 is. For example, if the measurement signal 202 agrees with a desired value, the actual evaluation value calculating unit 500 outputs "1" of the actual evaluation value signal 203. If, on the other hand, the measurement signal 202 does not agree with a desired value, then the actual evaluation value calculating unit 500 outputs "0" of the actual evaluation value signal 203. It should be noted that the actual evaluation value calculating unit 500 may output the actual evaluation value signal 203 to be inversely proportional to a deviation between the measurement signal 202 and the desired value.

As a function of implementing the learning function 300, reinforcement learning can be given. In the reinforcement learning, the learning function 300 generates the operation signal 201 in a trial and error manner in the early stage of learning. Thus, it is highly probable that the actual evaluation value signal 203 would have a small value. As the learning unit 300 iterates a trial and error method for certain times to pursue learning, the learning unit 300 learns to generate the operation signal 201 such that the actual evaluation value signal 203 has a large value. As examples of the learning algorithm to be used, algorithms such as Actor-Critic, Q-learning and real time Dynamic Programming described in the Non-Patent Document 1 can be given. In a framework called a Dyna-architecture that has been reviewed in the Non-Patent Document 1, the learning unit 300 learns to generate the operation signal based on a model 400 that simulates a control subject and the operation signal 201 can be generated based on the learned results.

The learning unit 300 has a function of generating an operation signal 204 to the model 400 and receiving a measurement signal 205 and an evaluation value signal 208 from the model 400. The evaluation value signal 208 is calculated by adding a first evaluation value signal 206 calculated at a first evaluation value calculating unit 600 based on a measurement signal 205 from the model 400 and a second evaluation value signal 207 calculated at a second evaluation value calculating unit 700.

The first evaluation value calculating unit 600 has a function of outputting the first evaluation value signal 206 such that the closer to the desired value the value of the measurement signal 205 from the model 400, the greater the value of the first evaluation value signal 206 may have. The actual evaluation value calculating unit 500 also includes the same function.

The second evaluation value calculating unit 700 calculates the second evaluation value signal 207 with reference to a model error characteristic database (DB) 800, an evaluation value database (DB) 900 and a process value database (DB) 1000. The second evaluation value calculating unit 700 outputs the second evaluation value signal 207 such that the closer to characteristics of the control subject 100 and the model 400 the second evaluation value calculating unit 700, the greater the value the second evaluation value signal 207 may have.

It should be noted that while the learning unit 300, the model 400, the actual evaluation value calculating unit 500, the first evaluation value calculating unit 600, the second evaluation value calculating unit 700, the model error characteristic database 800, the evaluation value database 900 and the process value database 1000 are located inside the control apparatus 200 as in the example shown in FIG. 1, the present invention is not limited thereto; some of the functions may be located outside the control apparatus 200 in alternative embodiments.

Figure 2:
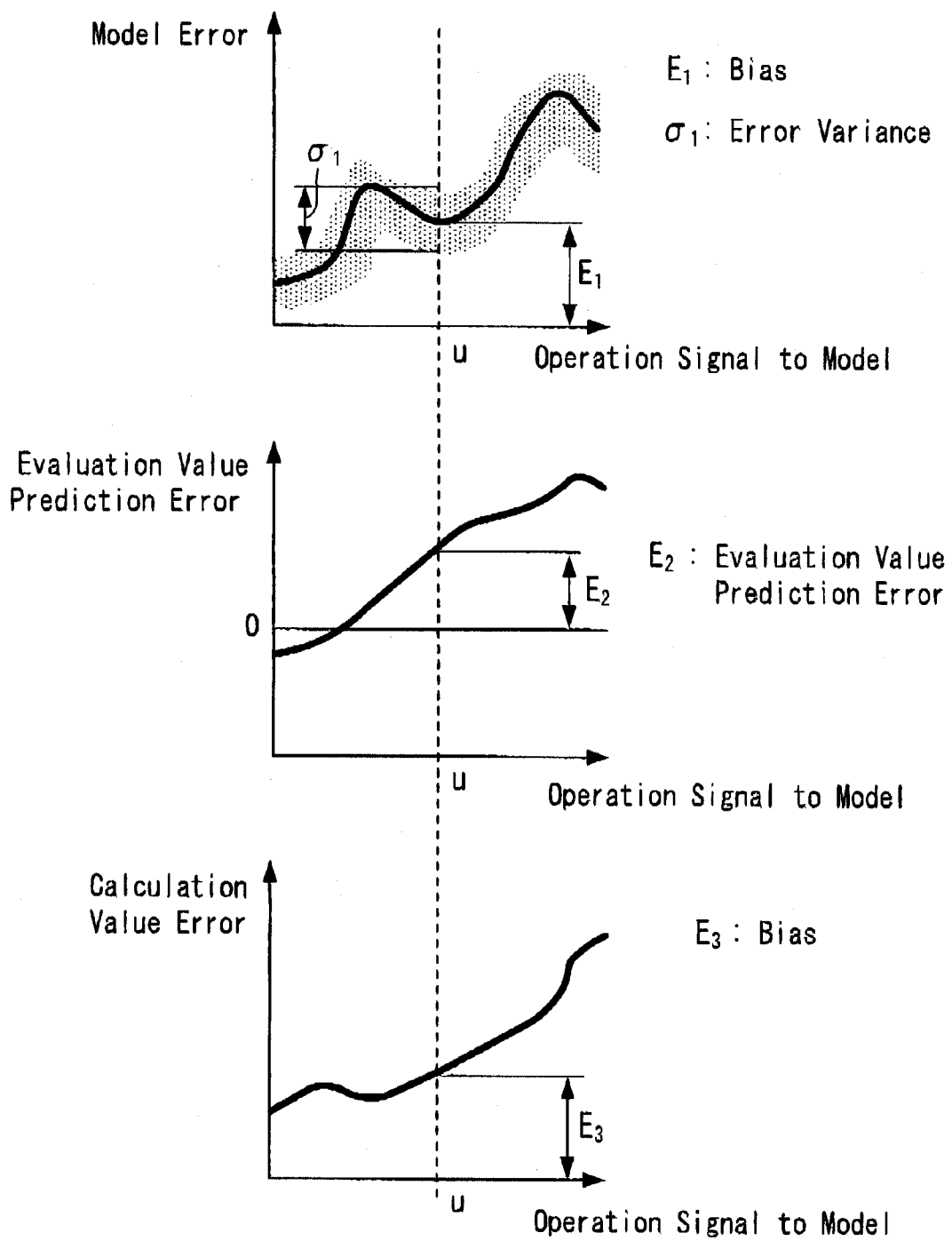
FIG. 2 is a diagram illustrating a method of generating a second evaluation value signal according to an example embodiment.

FIG. 2 is a diagram illustrating a method of generating a second evaluation value signal. The second valuation value signal 207 may be calculated using equations (1) to (3) based on the error of the above-described model. That is, the second valuation value signal 207 may be calculated using a 4-dimensional error evaluation vector X including a pre-evaluation model error bias E1, a pre-evaluation model error variance σ1, an evaluation value prediction error E2 and a model error bias E3, and a 4-dimensional weight vector W. Here, the above-described weight vector W (w1, w2, w3, w4) may be preliminary set by a designer.

$$R_2 = X^T W \quad (1)$$

$$X = (E_1 \sigma_1 E_2 E_3)^T \quad (2)$$

$$W = (w_1 w_2 w_3 w_4)^T \quad (3)$$

It should be noted that the above-described pre-evaluation model error bias E1 and the pre-evaluation model error variance σ1 may be obtained with reference to the model error characteristic database 800. The evaluation prediction error may also be obtained with reference to the evaluation value database 900 and the measurement value error bias may be obtained with reference to the process value database 1000.

The model error characteristic database 800 stores error characteristics of the output of the control subject 100 and the output of the model 400 for the identical operational inputs that have already been figured out at the model configuration. More specifically, a model for an operation input with a certain range may be configured with high accuracy and the model error characteristic database 800 may store information on the model error for the operation input departing from the above-described operation range, for example, bias and variance of a model error for the operation input which have been clarified at the preliminary verification of the model.

Further, it is frequently observed that characteristics of the control subject 100 and those of the model 400 deviate from each other due to aging. The model error characteristic database 800 can store preliminary information on the model error due to aging.

The second evaluation value calculating unit 700 outputs the second evaluation value signal 207 such that the greater the model error, the smaller the value the second evaluation value signal 207 may have. Specifically, generation of such an output can be achieved by setting the weight coefficient to a negative value.

The evaluation value database 900 stores information indicating a relationship between the actual evaluation value signal 203 and the operation signal 201, and further stores information indicating a relationship between the first evaluation signal 206 and the operation signal 204. When characteristics between the control subject 100 and the model 400 include errors, although the identical operation signal is supplied to the second evaluation value calculating unit 700, respective measurement signals may include different values. As a result, errors are obtained between the above-described evaluation value signal 203 and the first evaluation value signal 206. Thus, the second evaluation value calculating unit 700 calculates a prediction error obtained in the evaluation value resulted from the model error with reference to the evaluation value database 900.

The prediction error is obtained by subtracting the value of the first evaluation value signal 206 from the prediction value of the actual evaluation value signal 203 when the operation signal 201 and the operation signal 204 have an identical value. If the prediction value of the actual evaluation value signal 203 is greater than the value of the first evaluation value signal 206, the prediction value becomes a positive value. If, on the other hand, the prediction value of the actual evaluation value signal 203 is smaller than the value of the first evaluation value signal 206, the prediction value becomes a negative value. The weight coefficient may be set to a positive value.

The evaluation value signal 203 calculated by the actual evaluation value calculating unit 500 is found to be greater than the first evaluation value signal 206 calculated by the first evaluation value calculating unit 600. This implies that the results obtained are better than expected when the operation signal effective to the model 400 is applied to the control subject 100. This outcome may due to the difference in characteristics of errors between the control subject and the model; however, it is beneficial to acquire the operation method of this kind.

The learning unit 300 may learn the above-mentioned operation method by adding the evaluation signal obtained with reference to the evaluation value database 900 as an element of the second evaluation signal 207.

The process value database 1000 stores information indicating a relationship between the measurement signal 202 and the operation signal 201, and further stores information indicating a relationship between the measurement signal 205 and the operation signal 204. As in the case of the pre-evaluation model error, the greater the model error, the smaller the second evaluation signal 207 may become by setting the weight coefficient to a negative value.

Figure 3:
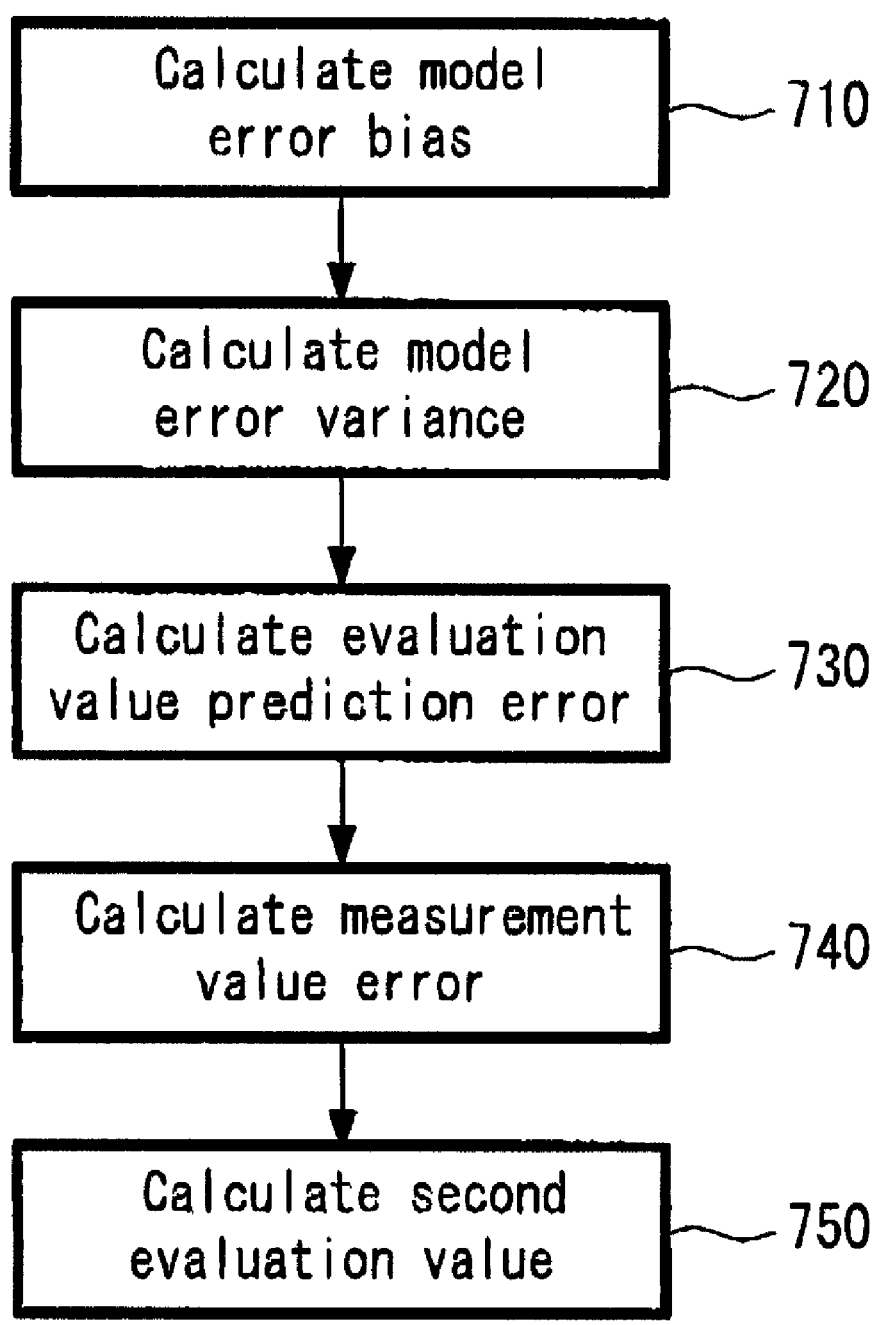
FIG. 3 is a flowchart illustrating processing performed by a second evaluation value calculating unit according to an example embodiment.

FIG. 3 is a flowchart illustrating processing performed by a second evaluation value calculating unit 700. As shown in FIG. 3, the second evaluation value calculating unit 700 includes respective steps of model error bias calculation processing 710, model error variance calculation processing 720, evaluation value prediction error calculation processing 730, measurement value error calculation processing 740 and second evaluation value calculation processing 750. It should be noted that the sequential order of the respective steps including the model error bias calculation processing 710, the model error variance calculation processing 720, the evaluation value prediction error calculation processing 730, the measurement value error calculation processing 740 and the second evaluation value calculation processing 750 may optionally be changed.

It should also be noted that, while the four categories, that is, the pre-evaluation model error bias, the variance, the evaluation value prediction error and the model error bias, are used for evaluation when the second evaluation value calculating unit 700 calculates the second evaluation value signal 207 not all four categories are used for the evaluation. In addition, to the above-mentioned examples, various statistical results (e.g., variance of the prediction value for the actual evaluation value) obtained with reference to the model error characteristic database 800, the evaluation value database 900 and the process value database 1000 can be used for the evaluation. Although not shown in FIG. 1, an image processing device may be located inside or outside the control apparatus 200 so that the operator can visually observe the operation of the control apparatus 200 through the image display device.

Figure 7:
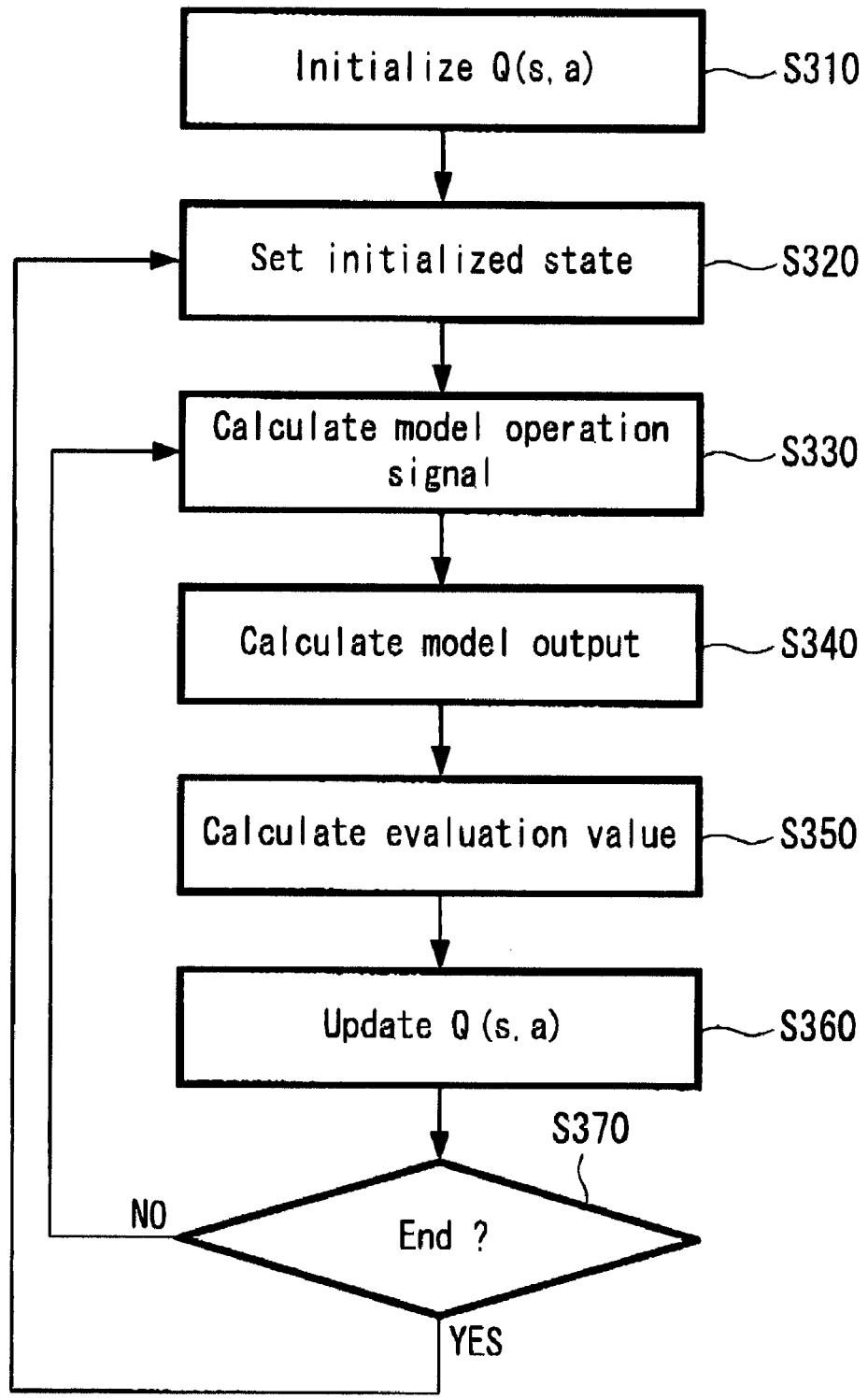
FIG. 7 is a flowchart illustrating steps in which a learning unit may learns to operate a control subject based on a model according to an example embodiment.

FIG. 7 is a flowchart illustrating steps in which a learning unit 300 may learns to operate a control subject 100 based on a model 400. In FIG. 7, an example shows a case where the Q-learning is used as a learning method.

The Q-learning uses a function of representing an evaluation value where an action a may be performed in a state s. The evaluation function is represented by Q (s, a). The state s may be defined by the operation signal 204 and the output 205. First, the evaluation function Q (s, a) is optionally initialized at step 310. Next, the output 205 obtained from the model 400 is calculated when an initial value of the operation signal 204 of the model 400 is determined at step 320.

Then, the action a in the state s is determined using the evaluation function Q (s, a) at step 330. Here, the action a is determined by using E-Greedy scheme and the like described in the Non-Patent Document 1. The operation signal 204 is updated by this action. Then, a model output 205 for the updated operation signal 204 is calculated at step 340. As a result, the state s is changed to a state s'.

Then, the first evaluation value calculating unit 600 and the second evaluation value calculating unit 700 calculate evaluation values, and thus calculated evaluation values are added to generate an evaluation value signal 208 at step 350.

At step 360, the value function Q (s, a) is updated using the following equation (4):

$$Q(s,a) \leftarrow Q(s,a) + \alpha[r + \gamma \max_a Q(s',a') - Q(s,a)] \quad (4)$$

In the above equation (4), r represents the value of the evaluation signal 208, $\alpha$ and $\gamma$ represent the parameters that are set by an operator of the control subject 100.

At the end determination step 370, whether or not the model output 205 satisfies a previously-determined condition is determined. If the model output 205 satisfies the previously-determined condition as represented by a YES at the decision step 370, the current step moves back to the step 320. If, on the other hand, the model output 205 does not satisfy the previously-determined condition as represented by a NO at the decision step 370, the current step moves back to the step 330.

It should be noted that, although not shown in FIG. 1, the image display device is located inside or outside the control apparatus 200 so that the operator can visually observe the operation of the control apparatus 200 through the image display device.

Figure 4:
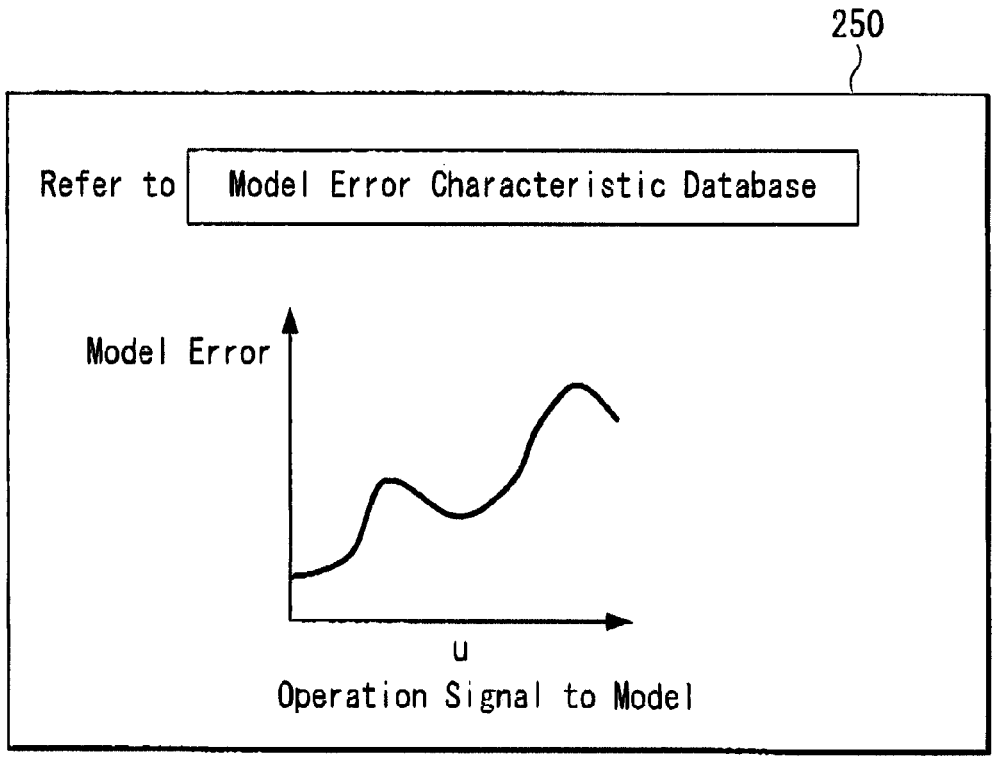
FIG. 4 is a diagram illustrating a screen displayed on an image display device according to an example embodiment.
Figure 4:
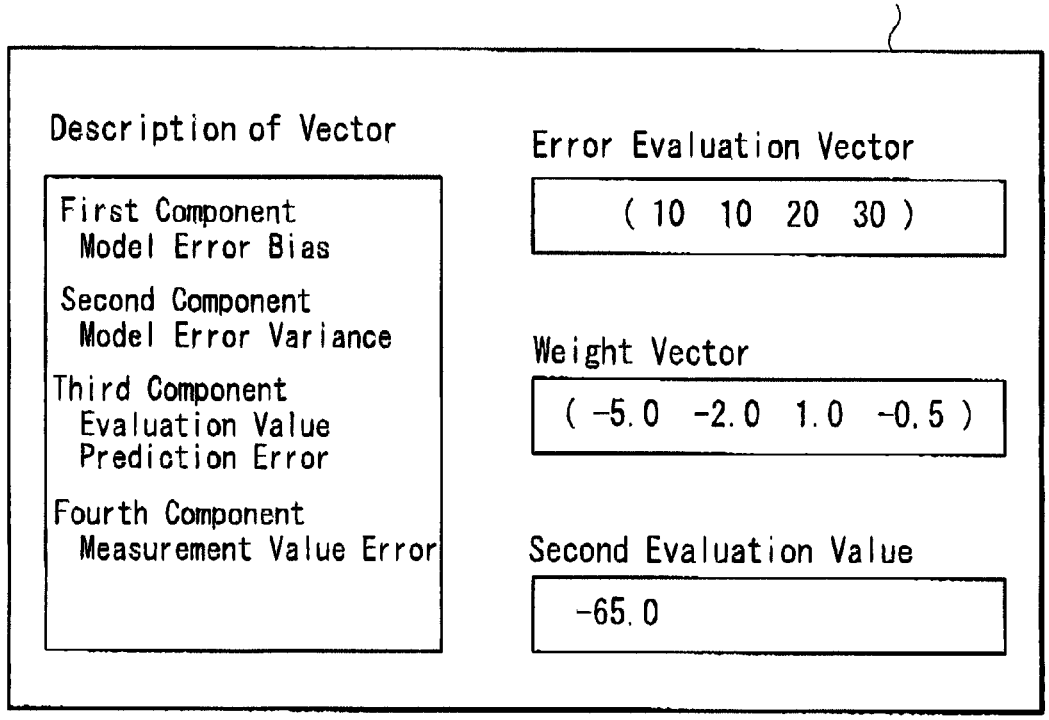

FIG. 4 is a diagram illustrating a screen displayed on an image display device. As shown in FIG. 2, a screen image 250 can be represented by various graphs obtained with reference to the model error characteristic database 800, the evaluation value database 900 and the process value database 1000.

An image 260 can be represented as values of the error evaluation vectors obtained with reference to the model error characteristic database 800, the evaluation value database 900 and the process value database 1000, a value of a weight vector set by the operator and a second evaluation value. The operator can set and adjust the value of the weight vector while observing the screen images 250 and 260.

Effects brought by the embodiment of the present invention will be described. In the embodiment of the present invention, the second evaluation value signal 207 calculated by the second evaluation value calculating unit 700 is added to the first evaluation signal 206 and supplied to the learning unit 300. In this case, the smaller the value the model error, the greater the value the second evaluation value signal 207 may become. Therefore, the learning unit 300 may learn to generate an operation signal in the region where a model error is small based on the model 400.

In the method according to the related art, the learning unit 300 may learn to generate the operation signal 204 that is effective to the model 400 in the region where the model error is large. In this case, it is probable that desired performance will not be obtained when an operation signal obtained by the related-art generation method is applied to the control subject 100. In the embodiment of the present invention, the learning unit 300 may learn to generate an operation signal obtained in a region where a model error is small or a region where a prediction value of the actual evaluation value signal 203 becomes larger than the evaluation value signal 206 obtained from the model. In addition, according to the embodiment, effects of improving safety of the control subject 100 can be obtained as compared with the related-art method.

Figure 5:
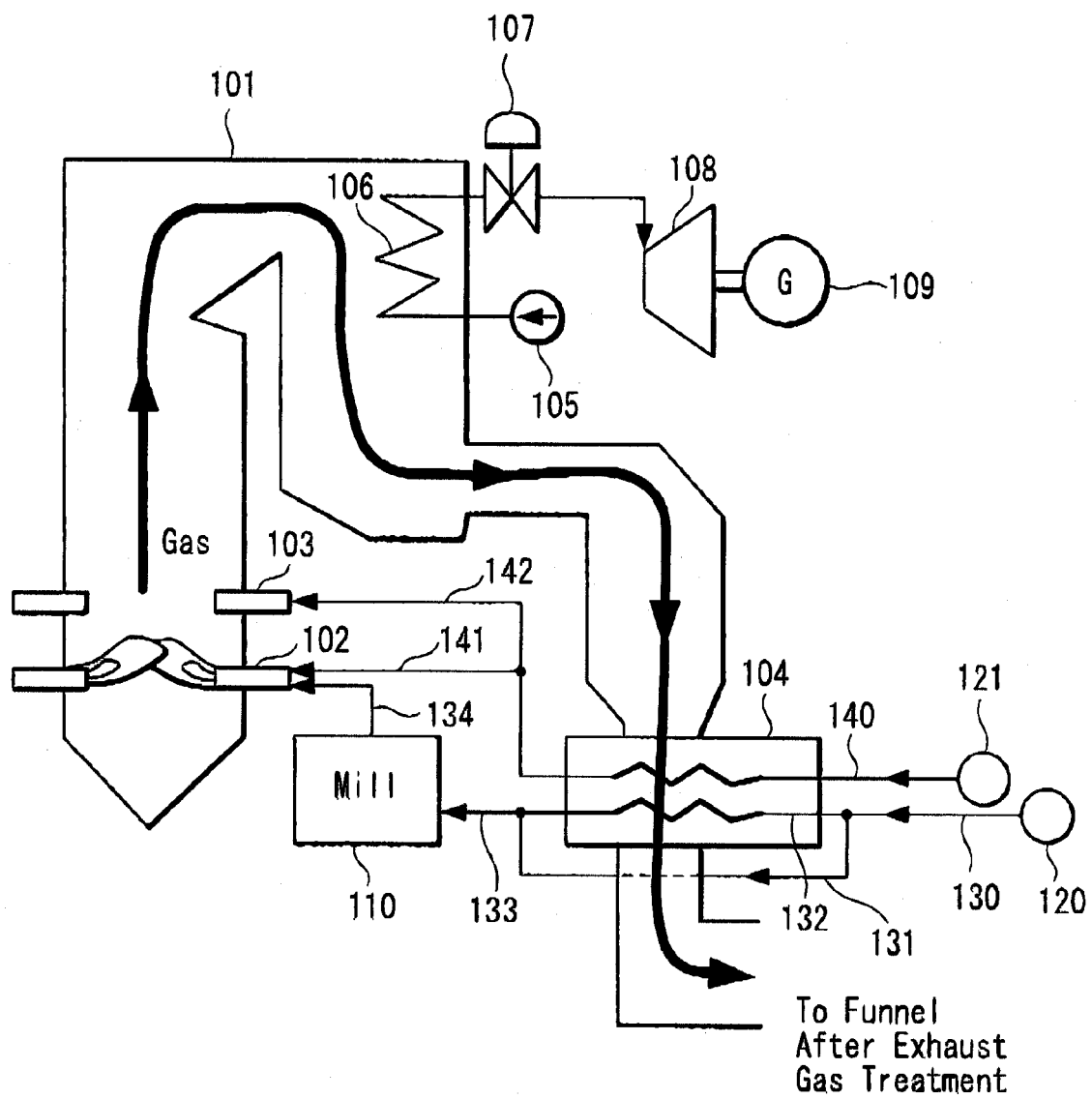
FIG. 5 is a schematic diagram illustrating a thermal electric power plant that is used as a control subject according to an example embodiment.

FIG. 5 is a schematic diagram illustrating a thermal electric power plant used as a control subject. First, a mechanism of generating electricity in the thermal electric power plant will be described.

As shown in FIG. 5, coals used as a fuel and primary air to convey coals and secondary air to adjust burning are supplied to a burner 102 installed in a boiler 101 and then coals are burned. The coals and the primary air are introduced into the burner 102 from a pipe 134 and the secondary air is introduced into the burner 102 from a pipe 141. After-air used for a two-staged combustion power generation system is introduced to the boiler 101 through an after-air port 103. The after-air is introduced from a pipe 142.

High-temperature gas generated by burning the coals flows along the exhaust channel of the boiler 101, passes through an air heater 104, is treated by an exhaust gas treatment and is discharged to the air through a funnel.

Water circulating in the boiler 101 is introduced to the boiler 101 through a water supply pump 105, heated by a gas in a heat exchanger 106 and changed into steam with high temperature and high pressure. While the one heat exchanger 106 is used in the embodiment of the present invention, the present invention is not limited thereto; for example, a plurality of heat exchangers may be installed in alternative embodiments.

The steam with high temperature and high pressure passed through the heat exchanger 106 is introduced to a steam turbine 108 through a turbine governor 107. Energy from the steam may drive the steam turbine 108 to cause a generator 109 to generate electricity.

Next, the paths through which the primary air and the secondary air supplied from the burner 102 and the after-air supplied from the after-air port 103 pass will be described.

The primary air is introduced into a pipe 130 through a fan 120, and divided in, at least, two ways; one, into a pipe 132 that passes through the air heater, the other, a pipe 131 that does not pass through the air heater. The primary air that passes through the two discrete pipes is then merged into one pipe 133, and then, introduced into a mill 110. The air passing through the air heater is heated by a gas. The primary air is used to transfer coals (pulverized coals) formed by the mill 100 to the burner 102.

The secondary air and the after-air are introduced into a pipe 140 through the fan 121, heated by the air heater 104, are divided in, at least, two ways; one, a second air pipe 141, and the other, an after-air pipe 142. The secondary air from discrete pipes is respectively introduced into the burner 102 and the after-air port 103.

Figure 6:
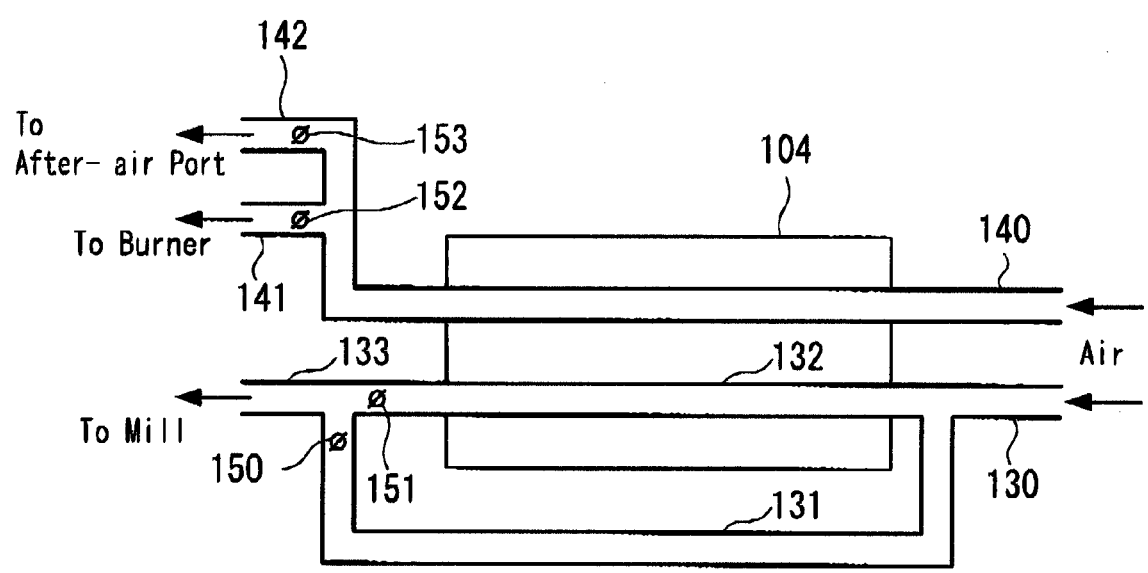
FIG. 6 is an enlarged schematic diagram showing a piping unit through which primary air or the like passes and an air heater according to an example embodiment.

FIG. 6 is an enlarged schematic diagram showing a piping unit through which primary air, secondary air, and after air pass as well as showing an air heater 104.

As shown in FIG. 6, air-dampers 150, 151, 152 and 153 are located on the pipes. The area where air passes through the pipes may be adjusted by the operation of the air-dampers. Therefore, a flow rate of air that passes through the pipes may be controlled. Here, the case where the control apparatus 200 is introduced in order to control NOx contained in the gas so that the NOx content become less than or equal to a setpoint value by controlling the air-dampers 150, 151, 152 and 153 will be described.

The two-staged combustion power generation system is known as a system effective for decreasing thermal NOx and fuel NOx. The two-staged combustion power generation system supplies air in an amount less than the air of the theoretical amount from the burner, and also supplies the deficit amount of air from the after-air port to realize perfect combustion. As a result, sudden combustion and a rise of a flame temperature can be inhibited as well as controlling the generation of the NOx by decreasing an oxygen concentration.

Specifically, the control apparatus 200 generates operation signals to operate the air-dampers 150, 151, 152 and 153 such that a ratio between the amount of air supplied from the burner and the amount of air supplied from the after-air port may be optimum for decreasing the NOx.

In order to perform such operation, the actual evaluation value calculating unit 500 and the first evaluation value calculating unit 600 in FIG. 1 calculate the actual evaluation value signal 203 and the first evaluation value signal 206 by using the following equation (5) or (6) where R represents the evaluation value signal, $Y_{NOx}$ represents the NOx measurement signal and $D_{NOx}$ represents the NOx setpoint value.

$$R = \begin{cases} 0 & Y_{NOx} > D_{NOx} \\ 1 & Y_{NOx} > D_{NOx} \end{cases} \quad (5)$$

$$R = D_{NOx} - Y_{NOx} \quad (6)$$

It should be noted that, while the evaluation value signal is calculated with focus on the NOx component in the embodiment of the present invention, the present invention is not limited thereto and an evaluation value may be obtained based on a plurality of measurement signals obtained by adding other gas components such as CO to the above-mentioned NOx component.

The model 400 simulates the characteristics of the boiler 101 and a NOx concentration may be obtained by setting and calculating various conditions of coals and air supplied from the burner and the air port. The model error characteristic database 800 may store information which preliminarily verifies an accuracy of the model 400 using the operation results of the boilers other than the target boiler 101.

More specifically, combustion characteristics of the boiler 101 are changed by adhering ashes to the heat exchanger and the wall of the boiler 101 after the ashes were generated from combustion of the coals, thereby affecting the amount of the generated NOx. Therefore, in order to remove the ashes, a soot blower is activated. For example, if the above-described model 400 is configured such that the model 400 simulates characteristics for one hour after the soot blower is activated, it may be expected that a value of NOx calculated by the model 400 and a value of NOx measured from the boiler 101 should be different due to the effect of adhering ashes during other elapsed time.

However, the above-mentioned model error characteristics may preliminarily be known from the operation results of the boiler and the model error characteristic database 800 may store information concerning such operation time and the model error characteristic. If noise characteristics (e.g., measurement value variance generated by noises) of a measuring instrument are preliminarily known, the noise characteristics may cumulatively be stored in the above-described evaluation model error characteristic database 800. Having the above-mentioned setting with the boiler, when the control subject 100 is a thermal electric power plant, the control apparatus 200 may control NOx contained in the exhaust gas so that the NOx may become less than or equal to a setpoint value.

As described above, according to the embodiment of the present invention, since the learning unit learns to generate the operation signal in a region where the model error is small, excellent control can be conducted as compared with the related-art method. Safety of the control subject may also be improved as compared with the related-art method. Specifically, according to the aforementioned Dyna-architecture or the related-art method described in the Patent Document 1, the learning unit may learn to generate the operation signal effective to the model in a region where the model error is large. Therefore, it is probable that the operation signal should be effective when the learned result is applied to the control subject. In contrast, according to the embodiment of the present invention, since the second evaluation value signal is added to the first evaluation value signal, the learning unit does not generate an operation signal in a region where the control subject and the model characteristic are different and learns to generate the operation signal only in the region where the characteristics approximate to each other. Therefore, safety of the control subject can be improved immediately after the operation of the thermal electric power plant has once started.

Next, a plant control apparatus, which is another embodiment of the present invention, will be described with reference to the drawings.

Figure 8:
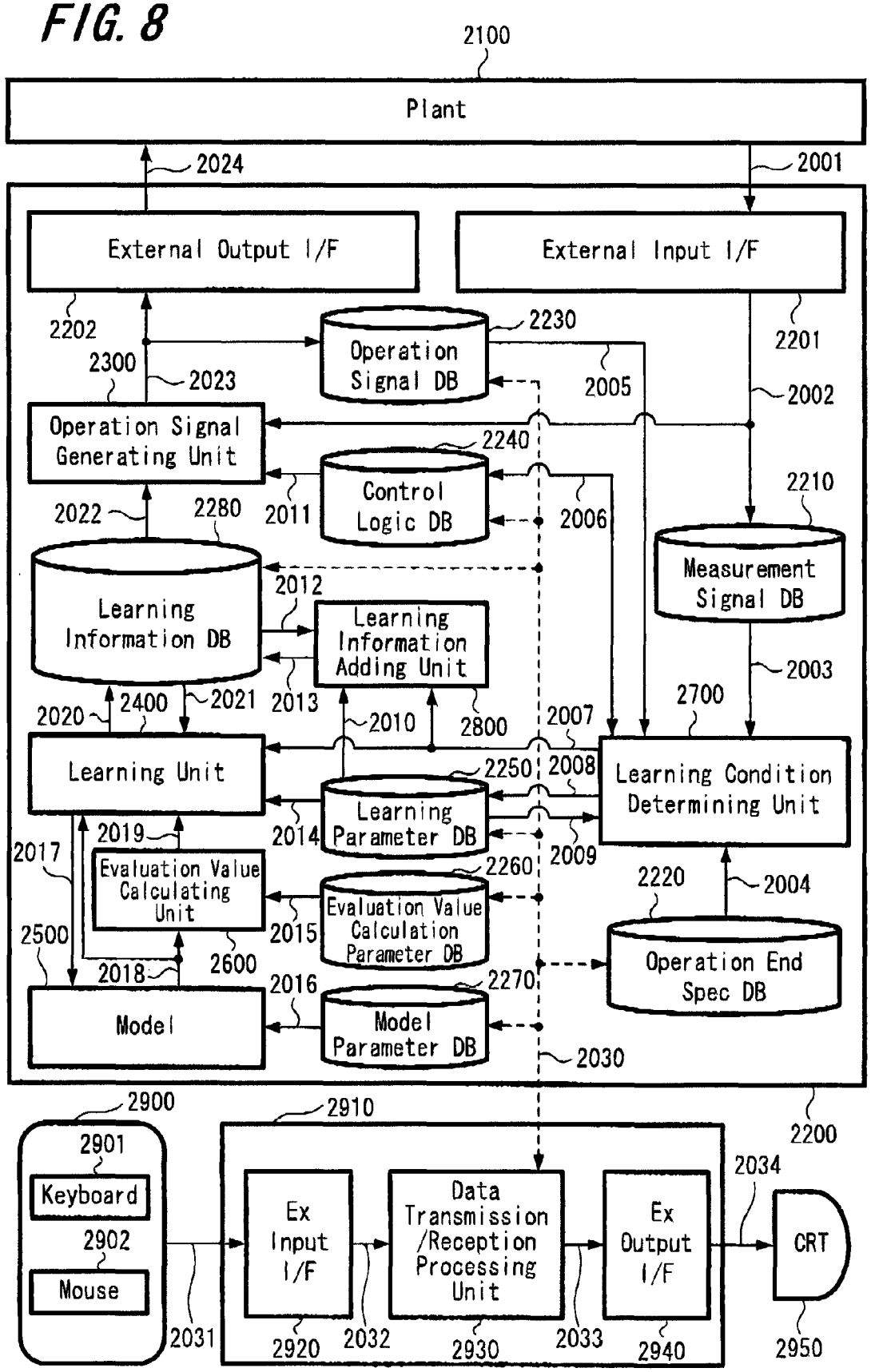
FIG. 8 is a functional block diagram showing an overall configuration of a plant control apparatus according to an embodiment of the present invention.

FIG. 8 is a control system diagram showing a plant control apparatus according to the embodiment of the present invention.

In FIG. 8, a plant 2100 is configured such that the plant 2100 is controlled by a control apparatus 2200.

The control apparatus 2200 to control the plant 2100 of the control subject respectively includes an operation signal generating unit 2300, a learning unit 2400, a model 2500, an evaluation value calculating unit 2600, a learning condition determining unit 2700 and a learning information adding unit 2800 as operation units.

Also, the control apparatus 2200 further includes a measurement signal database 2210, an operation end specification database 2220, an operation signal database 2230, a control logic database 2240, a learning parameter database 2250, an evaluation value calculation parameter database 2260, a model parameter database 2270 and a learning information database 2280 as databases, respectively.

The control apparatus 2200 still further includes an external input interface (I/F) 2201 and an external output interface (I/F) 2202 as external interfaces, respectively.

In the control apparatus 2200, a measurement signal 2001, which is a control output of the plant 2100, is supplied from the plant 2100 through the external input interface 2201. An operation signal 2024 directing a control instruction is transmitted from the control apparatus 2200 to the control subject 2100 through the external output interface 2202.

Next, control in the control apparatus 2200 will be described in detail. The measurement signal 2002 supplied to the external input interface 2201 as the measurement signal 2001 of the plant 2100 is transmitted to the operation signal generating unit 2300 and is stored in the measurement signal database 2210. An operation signal 2023 generated by the operation signal generating unit 2300 is transmitted to the external output interface 2202 and is stored in the operation signal database 2230.

The operation signal generating unit 2300 generates the operation signal 2023 by using control logic data 2011 stored in the control logic database 2240 and learning information data 2022 stored in the learning information database 2280 in such a manner that the measurement signal 2001 of the plant 2100 may achieve an operation setpoint value.

The control logic database 2240 may store parameters of a control circuit and a control for calculating the control logic data 2011 in order to output the control logic data 2011 to the operation signal generating unit 2300.

Learning information data stored in the learning information database 2280 is generated by the learning unit 2400 or the learning information adding unit 2800. The learning unit 2400 is connected to the model 2500, the evaluation value calculating unit 2600 and the learning condition determining unit 2700, respectively.

The model 2500 has a function of simulating the control characteristic of the plant 2100. More specifically, the model 2500 simulates and computes the control characteristics of the plant 2100 such that an operation signal 2024 directing a control instruction is supplied to the plant 2100 to obtain the measurement signal 2001 of the controlled result. In order to carry out the simulation and computation, the model 2500 receives a model input 2017 to operate the model 2500 from the learning unit 2400 and the model 2500 simulates and computes the control operation of the plant 2100 to thereby obtain a model output 2018 of the simulated and computed result. Here, the model output 2018 becomes a prediction value of the measurement signal 2001 of the plant 2100.

The model 2500 has a model to simulate and compute the control characteristics of the plant 2100. The model 2500 has a function of calculating the model output 2018 for the model input 2017 using a physical model based on the Laws of Physics, a statistical model using a statistical method such as neural networks or using a combination of the physical model and the statistical model.

As other data required for the model 2500 to calculate the model output 2018 by simulating and computing control of the plant 2100 based on the model output 2017, data stored in the model parameter database 2270 are used by inputting to the model 2500.

The evaluation value calculating unit 2600 calculates the evaluation value 2019 using the evaluation value calculation parameter 2015 stored in the evaluation value calculation parameter database 2260 and the model output 2018 inputted from the model 2500.

The learning unit 2400 generates the model input 2017 to be inputted to the model 2500 using the learning information data 2021 stored in the learning information database 2280 and the learning parameter 2014 stored in the learning parameter database 2250.

The model 2500 inputs the model input 2017 and outputs the model output 2018 simulated and calculated by using an internal simulation model.

The evaluation value calculating unit 2600 calculates the evaluation value 2019 from the model output 2018 simulated and calculated at the model 2500 and inputs the evaluation value 2019 to the learning unit 2400.

In order to set a limit value of an operation signal range per unit time included in the learning parameters to the learning constraint condition and to learn the plant operation method using the model, the learning unit 2400 learns to generate a model input where the model output 2018 simulated and calculated at the model 2500 may achieve the model output setpoint value using the model output 2018 or the evaluation value 2019. Learning information data 2020 indicating the learned result is stored in the learning information database 2280.

The learning condition determining unit 2700 may generate an initial value of the learning parameter 2008 including a limit value of the operation signal range per unit time using the operable range of the operation end of the plant and the operation end specification data 2004 of the operation speed stored in the operation end specification database 2220 and control logic data 2006 stored in the control logic database 2240.

The learning condition determining unit 2700 may update the learning parameter 2008 using the measurement signal data 2003 of previous measurement signals stored in the measurement signal database 2210, the operation signal data 2005 of previous operation signals stored in the operation signal database 2230 and the learning parameter 2009 stored in the learning parameter database 2250.

When the value of the learning parameter 2009 and that of the learning parameter 2008 are different from each other, a learning trigger signal 2007 is set to "1" and this value is transmitted to the learning unit 2400 and the learning information adding unit 2800. Otherwise, the learning trigger signal 2007 holds the value of "0".

When the learning trigger signal 2007 turns to "1", the learning information adding unit 2800 generates added learning information data 2013 using the learning parameter 2010 stored in the learning parameter database 2250 and the learning information data 2012 stored in the learning information database 2280. The added learning information data 2013 is stored in the learning information database 2280.

The operator of the plant 2100 can access information stored in various databases provided in the control apparatus 2200 by using an external input apparatus 2900 including a keyboard 2901 and a mouse 2902, a maintenance tool 2910 including a data transmission and reception processing unit 2930 which can transmit and receive data to and from the control apparatus 2200, and an image display apparatus 2950.

The maintenance tool 2910 includes an external input interface 2920, the data transmission and reception processing unit 2930 and an external output interface 2940.

A maintenance tool input signal 2031 generated by the input apparatus 2900 is stored in the maintenance tool 2910 through the external input interface 2920. The data transmission and reception processing unit 2930 of the maintenance tool 2910 may obtain the database information 2030 from the control apparatus 2200 in accordance with information stored in the maintenance tool input signal 2032.

The data transmission and reception processing unit 2930 transmits a maintenance tool output signal 2033 obtained by processing the database information 2030 to an external output interface 2940. The maintenance tool output signal 2034 is displayed on the image display apparatus 2950.

It should be noted that, in the above-described control apparatus 2200 according to the embodiment of the present invention, while the control signal database 2210, the operation end specification database 2220, the operation signal database 2230, the control logic database 2240, the learning parameter database 2250, the evaluation value calculating parameter database 2260, the model parameter database 2270, and the learning information database 2280 are located inside the control apparatus 2200 all of or some of the databases 2210 to 2280 may be located outside of the control apparatus 2200.

Similarly, the learning unit 2400, the model 2500, the evaluation value calculating unit 2600, the learning condition determining unit 2700, and the learning information adding unit 2800 are included in the control apparatus 2200; however, all of or some of the units may be located outside of the control apparatus 2200.

For example, the learning unit 2400, the model 2500, the evaluation value calculating unit 2600, the learning parameter database 2250, the evaluation value calculating parameter database 2260, and the model parameter database 2270 may be configured as an external system. The external system and the control apparatus 2200 may be connected via the Internet, so that the learning information data 2020 generated by the learning unit 2400 of the external system may be transmitted to the control apparatus 2200 via the Internet.

If the control apparatus 2200 is configured without one of or both of the evaluation value calculating unit 2600 and the learning information adding unit 2800, then, although a high control function is lowered, the plant 2100 can be controlled.

The control apparatus 2200 may also be configured with a function of correcting the model parameter 2016 stored in the model parameter database 2210 such that the characteristics of the plant 2100 and the model 2500 may agree with each other.

Hereinafter, an example in which the plant control apparatus 2200 according to the embodiment of the present invention is applied to a thermal electric power plant 2100a will be described. It should be noted that the control apparatus 2200 according to the embodiment of the present invention can be used to control plants other than the thermal electric power plant.

Figure 9:
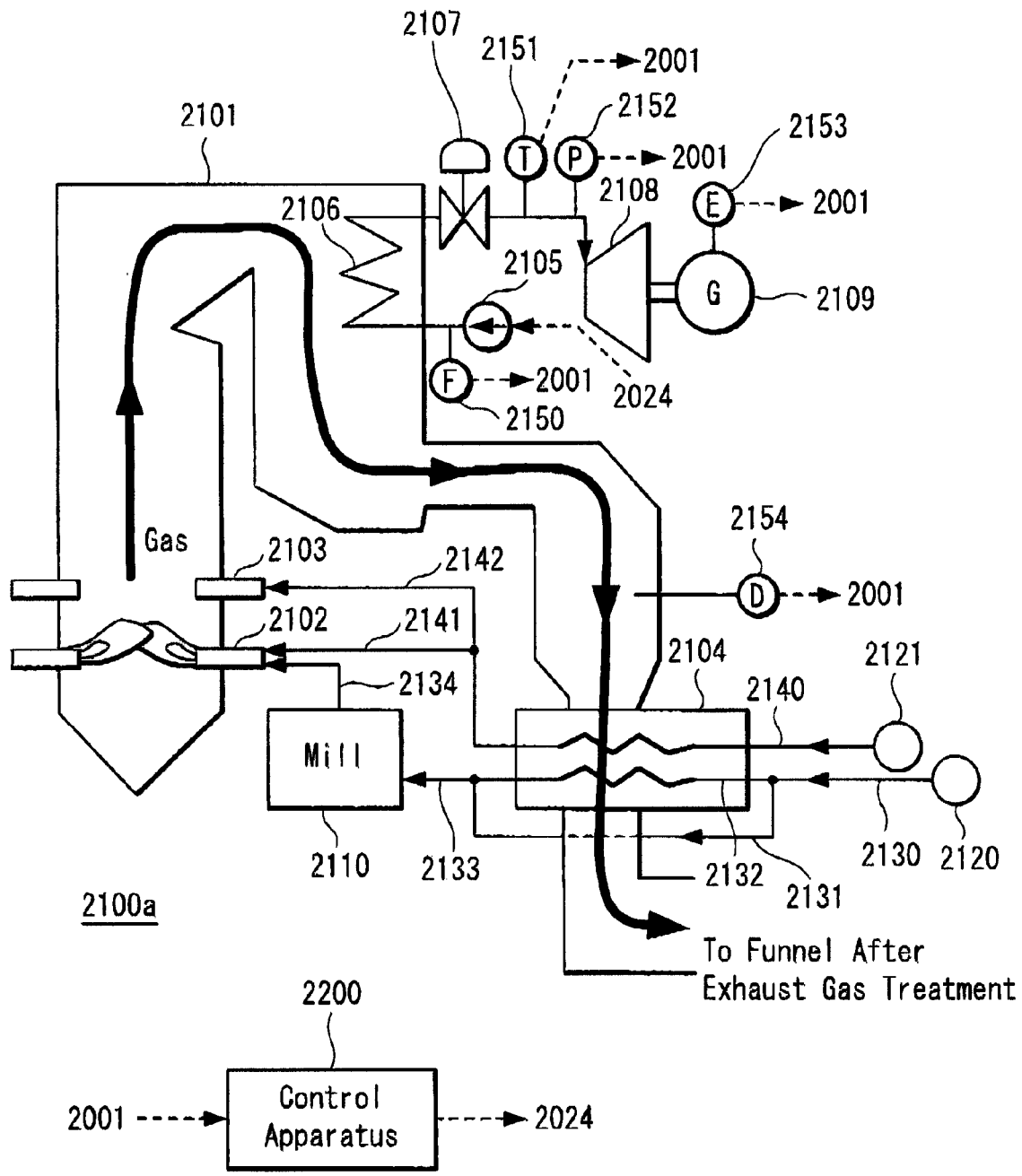
FIG. 9 is a schematic diagram showing an configuration of a thermal electric power plant to which the plant control apparatus according to the embodiment of the present invention is applied.

FIG. 9 is a schematic diagram showing a configuration of a thermal electric power plant 2100a to which the plant control apparatus according to the embodiment of the present invention is applied. First, a mechanism of generating electricity in the thermal electric power plant 2100a will be described.

As shown in FIG. 9, a boiler 2101 constituting the thermal electric power plant 2100a is provided with a burner 2102 into which are supplied pulverized coals of a fuel obtained by pulverizing coals with a mill 2110, primary air for transferring the pulverized coals, and secondary air to adjust the fuel. The pulverized coals supplied to the boiler 2101 through this burner 2102 are burned inside the boiler 2101. It should be noted that the pulverized coals and the primary air are introduced from a pipe 2134 into the burner 2102 and that the secondary air is introduced from a pipe 2141 into the burner 2102.

Also, the boiler 2101 is provided with an after-air port 2103 to supply after-air for a two-staged combustion power generation system to the boiler 2101 and the after-air is introduced from a pipe 2142 into the after-air port 2103.

High temperature combustion gas generated by combusting the pulverized coals flows to the downstream side along a path laid inside the boiler 2101, passed through a heat exchanger 2106 provided at the boiler 2101, thereby being heat-exchanged. Thus, steam with high temperature and high pressure may be generated from an air heater 2104. The combustion gas is then treated by an exhaust gas treatment and discharged from the funnel to the air.

Water circulating the heat exchanger 2106 of the boiler 2101 is supplied to the heat exchanger 2106 through a water supply pump 2105. The supplied water is heated by a combustion gas downwardly flowing through the boiler 2101 in the heat exchanger 2106 and changed into steam with high temperature and high pressure. It should be noted that while the single heat exchanger 2106 is used in the embodiment of the present invention, the present invention is not limited thereto; a plurality of heat exchangers 2106 may be provided in alternative embodiments.

The steam with high temperature and high pressure passed through the heat exchanger 2106 is introduced into a steam turbine 2108 through a turbine governor 2107 and the steam turbine 2108 is driven by steam energy to allow a generator 2109 to generate electricity.

Various measuring instruments for detecting the operation state of the thermal electric power plant are provided in the thermal electric power plant 2100a. Information on the control output of the plant obtained from the measuring instruments may be transmitted to the control apparatus 2200 as the measurement information 2001. For example, FIG. 9 shows a flow rate measuring instrument 2150, a temperature measuring instrument 2151, a pressure measuring instrument 2152, a generated output measuring instrument 2153, and a concentration measuring instrument 2154 as instruments for measuring information on the control output of the plant.

The flow rate measuring instrument 2150 measures a flow rate of water supplied from the water supply pump 2105 to the boiler 2101. Also, the temperature measuring instrument 2151 and the pressure measuring instrument 2152 may measure a temperature and pressure of the steam supplied from the heat exchanger 2106 to the steam turbine 2108.

The generated output measuring instrument 2153 may measure electric energy generated from the generator 2109. The concentration measuring instrument 2154 provided at the downstream side of the boiler 2101 can measure information on concentrations of components (CO, NOx, etc.) contained in the combustion gas passing through the boiler 2101.

It should be noted that, while a large number of measuring instruments except the measuring instruments shown in FIG. 9 are located in the thermal electric power plant, illustrative drawings are omitted from FIG. 9.

Next, paths of the primary air and the secondary air supplied to the inside of the boiler 2101 from the burner 2102 and a path of the after-air supplied from the after-air port 2103 will be described.

The primary air is introduced from the fan 2120 into the pipe 2130, divided in, at least, two ways: one, the pipe 2132 passing through the air heater 2104 located on the downstream side of the boiler 2101, and the other, the bypassing pipe 2131, and the primary air passed through the discrete two pipes is merged at the pipe 2133 and introduced into the mill 2110 located at the upper stream side of the burner 2102.

Air passing through the air heater 2104 is heated by combustion gas downwardly flowing through the boiler 2101. Pulverized coals pulverized in the mill 2110 are transferred with the primary air to the burner 2102 using the primary air.

The secondary air and the after-air are introduced from the fan 2121 into the pipe 2140, similarly heated by the air heater 2104, divided in, at least, two ways: one, the secondary air pipe 2141 and the other, the after-air pipe 2142, and respectively introduced into the burner 2102 and the after-air port 2103.

Figure 10:
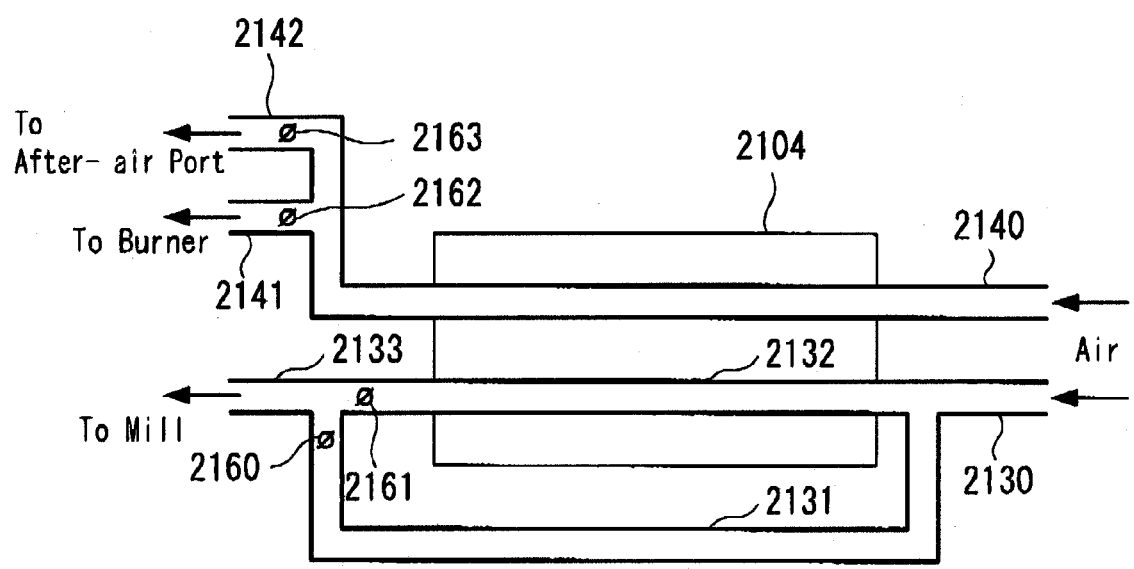
FIG. 10 is an enlarged diagram showing a piping unit and an air heater unit of the thermal electric power plant shown in FIG. 9.

FIG. 10 is an enlarged diagram showing pipe portions of the pipes 2130, 2131, 2132, 2133, 2140, 2141 and 2142 through which the primary air, the secondary air and the after-air shown in FIG. 9 may pass and the air heater 2104.

As shown in FIG. 10, of these pipes, the pipes 2131, 2132, 2141 and 2142 are provided with air dampers 2160, 2161, 2162 and 2163, respectively. Since the areas in which air may pass through the above respective pipes 2131, 2132, 2141 and 2142 can be varied by respectively operating these air dampers 2160, 2161, 2162 and 2163, it is possible to separately adjust flow rates of air that passes through the pipes 2131, 2132, 2141 and 2142.

Equipment such as the water supply pump 2105, the mill 2110 and the air dampers 2160, 2161, 2162, 2163 constituting operation ends to control the state quantity of the thermal electric power plant 2100a of the control subject are respectively operated using various operation signals 2024 generated by control of the control apparatus 2200. It should be noted that, in the embodiment of the present invention, the equipment such as the water supply pump 2105, the mill 2110 and the air dampers 2160, 2161, 2162 and 2163 will be referred to as the operation ends, and a instruction signal necessary for operating these elements will be referred to as the operation signal 2024.

Functions of increasing and decreasing discharge angles at which air for combustion or fuels such as pulverized coals are also supplied to the boiler 2101 can be provided with the burner 2102 and the after-air port 2103 and these discharge angles also can be included in the operation signal 2024.

Figure 11:
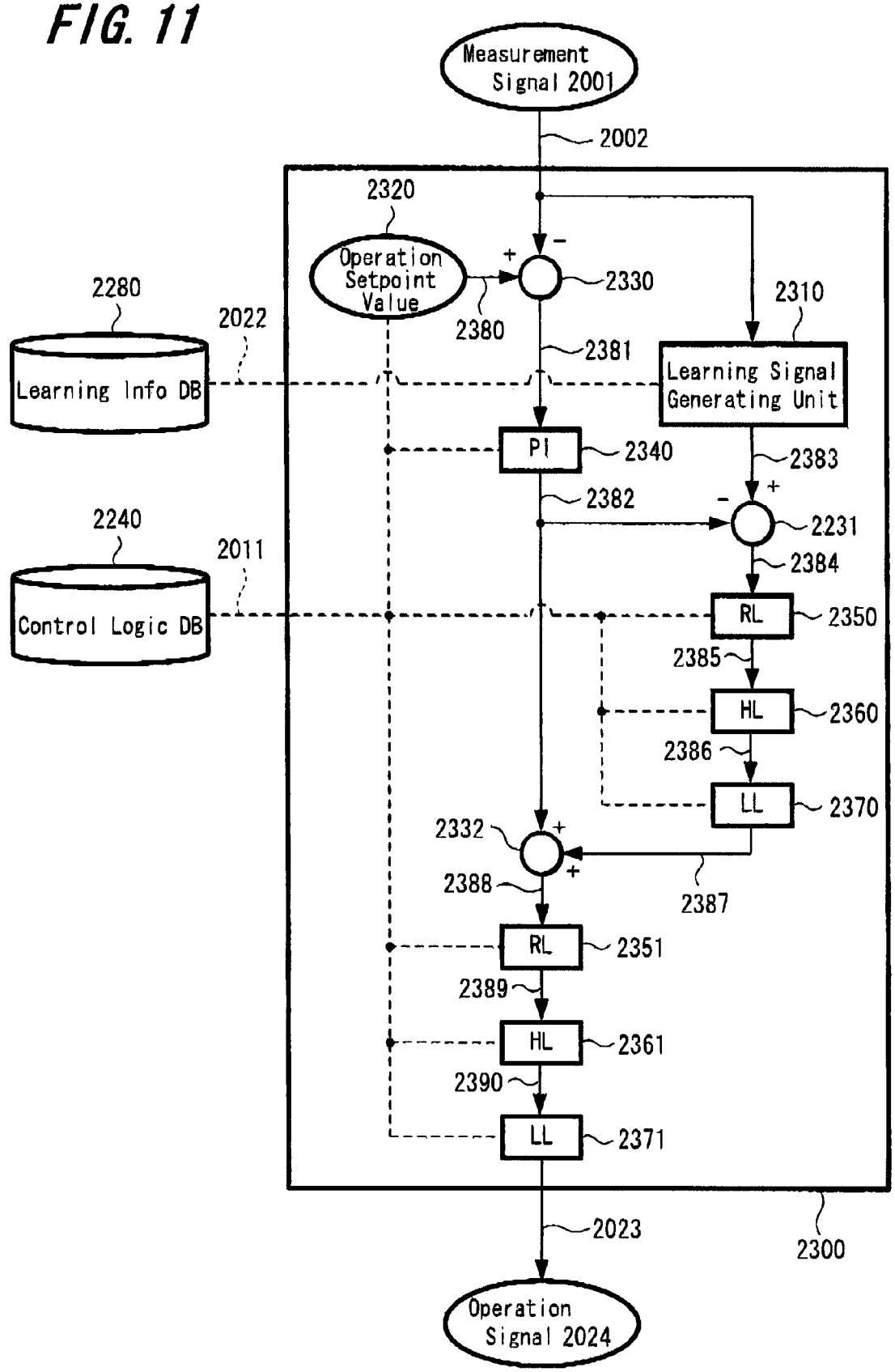
FIG. 11 is a schematic block diagram showing an operation signal generating unit of the plant control apparatus shown in FIG. 8.

FIG. 11 is a schematic block diagram illustrating signal processing in the operation signal generating unit 2300 of the control apparatus 2200. As shown in FIG. 11, the measurement signal 2002 collected from the measurement signal 2001 of the plant 2100 through the external input interface 2201, the learning information data 2022 stored in the learning information database 2280 and the control logic data 2011 stored in the control logic database 2240 are respectively inputted into the operation signal generating unit 2300. The operation signal 2024 obtained at the operation signal generating unit 2300, with reference to the signals and data directing a control instruction for the plant 2100, is generated as the operation signal 2023 outputted through the external input interface 2202.

The operation signal generating unit 2300 includes the learning signal generating unit 2310, the operation setpoint value 2320, adder-subtractors 2330, 2331, 2332, a proportional-integral controller 2340, rate limiters 2350, 2351, high value selectors 2360, 2361, low value selectors 2370 and 2371. The respective devices are connected in the modes shown in FIG. 11.

As control parameters required for operating the above-described respective devices of the operation signal generating unit 2300, control parameters stored in the control logic database 2240 and the learning information database 2280 may be used. It should be noted that the configuration of the operation signal generating unit 2300 is not limited to those of the devices shown in FIG. 11 and that other configuration may also be used.

The adder-subtractors 2330, 2331 and 2332 may add or subtract signal values to a zero value using inputted two types of signals. In FIG. 11, a signal to be added is represented by "+" and a signal to be subtracted is represented by "−", respectively.

The above-described adder-subtractor 2330 calculates the signal 2381 by using the measurement signal 2002 and the operation setpoint value signal 2380 stored in the operation signal generating unit 2300 based on a function of the following equation (7) incorporated in the adder-subtractor 2330.

$$x_1 = x_2 - x_3 \tag{7}$$

Here, $x_1$ represents the value of the signal 2381, $x_2$ represents the value of the operation setpoint value signal 2380, and $x_3$ represents the value of the measurement signal 2002, respectively.

Next, the proportional-integral controller 2340 may calculate a reference signal 2382 using the signal 2381 and a preceding value of the signal 2381 and a preceding value of the reference signal 2382 based on a function of the following equation (8) incorporated in the proportional-integral controller 2340. It should be noted that the preceding value means a value obtained per one sample control period before.

$$x_4 = P_1(x_5 - x_6) + P_2 x_5 + x_7 \tag{8}$$

Here, $P_1$ and $P_2$ represent the control parameters, $x_4$ represents the value of the reference signal 2382, $x_5$ represents the signal 2381, $x_6$ represents the preceding value of the signal 2381 and $x_7$ represents the preceding value of the reference signal 2382, respectively.

The learning signal generating unit 2310 generates a recommendation signal 2383 by using the measurement signal 2002 with reference to the learning information data 2022 stored in the learning information database 2280. This recommendation signal 2383 is used as a recommendation value of the operation signal 2023.

The learning information data 2022 stored in the learning information database 2280 is the data required by the learning unit 2400 to configure the function of generating the model input 2017 from the evaluation value 2019. The learning signal generating unit 2310 generates the recommendation signal 2383 from the measurement signal 2002 in the same manner as the learning unit 2400 that generates the model input 2017 from the evaluation value 2019.

The adder-subtractor 2331 calculates a signal 2384 using the reference signal 2382 and the recommendation signal 2383 based on a function of the following equation (9) incorporated in the adder-subtractor 2331.

$$x_8 = x_9 - x_{10} \tag{9}$$

Here, $x_8$ represents the value of the signal 2384, $x_9$ represents the value of the recommendation signal 2383 and $x_{10}$ represents the value of the reference signal 2382, respectively.

The rate limiter 2350 limits the value of the signal 2384 which changes per sample control period. This rate limiter 2350 calculates the signal 2385 based on a function of the following equation (10) incorporated in the rate limiter 2350.

$$x_{11} = \begin{cases} x_{12} + p_3 & \text{if } x_{13} - x_{12} > p_3 \\ x_{13} & \text{if } p_3 \geq x_{13} - x_{12} \geq p_4 \\ x_{12} - p_4 & \text{if } p_4 > x_{13} - x_{12} \end{cases} \quad (10)$$

Here, $P_3$ and $P_4$ represent the control parameters, $x_{11}$ represents the signal 2385, $x_{12}$ represents the preceding value of the signal 2384, and $x_{13}$ represents the value of the signal 2384. $P_3$ and $P_4$ will be referred to as an "increment rate parameter" and a "decrement rate parameter", respectively.

The value of the signal 2385 may be limited using the rate limiter 2350 such that the value of the operation signal 2384 that changes per sample control period may fall within the value of the increment rate parameter and the value of the decrement rate parameter.

The high value selector 2360 has a function of limiting the signal 2386 such that the signal 2386 may not become less than or equal to a certain threshold value. The high value selector 2360 may calculate the signal 2386 based on a function of the following equation (11) incorporated in the high value selector 2360.

$$x_{14} = \begin{cases} p_5 & \text{if } p_5 > x_{15} \\ x_{15} & \text{if } x_{15} \geq p_5 \end{cases} \quad (11)$$

Here, $P_5$ represents the control parameter, $x_{14}$ represents the signal 2386, and $x_{15}$ represents the value of the signal 2385, respectively. $P_5$ will be referred to as a "lower limit parameter". The high value selector 2360 can control the signal 2386 so that the value of the signal 2386 may not become less than or equal to the value of $P_5$.

The low value selector 2370 has a function of controlling the correction signal 2387 such that the correction signal 2387 may not become greater than or equal to a certain threshold value. The low value selector 2370 may calculate the correction signal 2387 based on a function of the following equation (12) incorporated in the low value selector 2370.

$$x_{16} = \begin{cases} p_6 & \text{if } x_{17} > p_6 \\ x_{17} & \text{if } p_6 \geq x_{17} \end{cases} \quad (12)$$

Here, $P_6$ represents the control parameter, $x_{16}$ represents the correction signal 2387 and $x_{1-7}$ represents the value of the signal 2386, respectively. $P_6$ will be referred to as a "upper limit parameter". The low value selector 2370 can control the correction signal 2387 such that the value of the correction signal 2387 may not become greater than or equal to the value of the upper limit parameter $P_6$.

While there are provided a plurality of rate limiters (RL), high value selectors (HL) and low value selectors (LL) are provided to the operation signal generating unit as shown in FIG. 11, manners of operations of the rate limiters (RL), the high value selectors (HL) and the low value selectors (LL) are identical to those of the functions represented by the equations (10) to (12). It should be noted that the control parameters of the rate limiters 2350, 2351, the high value selectors 2360, 2361 and the low value selectors 2370, 2371 can be set separately.

The operator of the plant 2100 can set the control parameters by using the external input apparatus 2900, the maintenance tool 2910 and the image display apparatus 2950.

The adder-subtractor 2332 may add the two types of signals to calculate the signal 2388 using the reference signal 2382 and the correction signal 2387 calculated by respective devices. The signal 2389 is calculated from the signal 2388 by using the rate limiter 2351, the signal 2390 is calculated from the signal 2389 using the high value selector 2361 and finally the operation signal 2023 is calculated from the signal 2390 by using the low value selector 2371. The operation signal 2023 is used as the instruction signal 2024 from the external interface 2202 to the plant 2100 and outputted from the control apparatus 2200.

When the operation signal generating unit 2300 of the control apparatus 2200 is configured as shown in FIG. 11, the following action and effects can be achieved.

First, since the operation signal generating unit 2300 includes the rate limiter 2351, the high value selector 2361, and the low value selector 2362, the operation signal 2023 can be limited within the previously-set allowable range and further the operation signal 2023 can be controlled so as not to drastically change with the value greater than or equal to the previously-set value.

Accordingly, the operation signal 2023 that is deviated from the operation speed range and operation range with the operation end may be prevented from being calculated and outputted as the instruction signal 2024.

Under a certain operation state of the plant 2100, if the operation signal 2023 that is used as the instruction signal 2024 is considerably changed, such change in operation signal 2023 will hinder the plant 2100 from safe operation. In such case, it is possible to operate the plant 2100 safely by properly setting the control parameter of the rate limiter 2351.

The operation signal generating unit 2300 shown in FIG. 11 does not directly calculate the operation signal 2023 using the recommendation signal 2383 calculated by the learning signal generating unit 2310 but the adder-subtractor 2331 subtracts the reference signal 2382 from the recommendation signal 2383. The resultant subtracted signal is then applied to the rate limiter 2350, the high value selector 2360 and the low value selector 2370, and the reference signal 2382 is finally added again.

Since the learning signal generating unit 2310 generates the recommendation signal 2383 with reference to the learning information database 2280 where learned results obtained using the model 2500 are stored, it is probable that desired performance may not be obtained if the characteristics of the model 2500 and those of the plant 2100 are different from each other and the recommendation signal 2383 is supplied to the plant 2100 as the instruction signal 2024.

If the recommendation signal 2383 is supplied to the plant 2100 as the instruction signal 2024, it is probable that the plant 2100 may not be operated safely.

In order to avoid such unsafe operations, the operation signal generating unit 2300 should properly set the control parameter using the rate limiter 2350, the high value selector 2360 and the low value selector 2370 such that the operation signal generating unit 2300 can adjust the recommendation signal 2383 generated from the learning signal generating unit 2310 to be effective to the operation signal 2023.

Since there is no information on a difference in characteristics between the model 2500 and the plant 2100 when the learning signal generating unit 2310 is introduced, various solutions can be taken as follows: the control parameter may be set such that the effect on the operation signal 2023 from the recommendation signal 2383 is small. After having observed the characteristics being agreed with each other, the control parameter is set again such that the effect on the operation signal 2023 from the recommendation signal 2383 is large.

There are various operation modes such as an operation mode with a constant power generation output to keep power generation constant, an operation mode with changing of power generation to vary power generation output, an operation mode with switching of a burner to switch ignition of the burner of the boiler 2101, and an operation mode with switching of the coal type to change the type of coal used as a fuel in the thermal electric power plant 2100a according to the embodiment of the present invention.

Since the control apparatus 2200 of the thermal electric power plant 2100a can be set according to the embodiment of the per operation mode of different types, an instruction signal matched with the operation mode of the plant can be generated.

FIG. 12 shows an example of a control parameter setting screen of the plant control apparatus 2200 according to the embodiment of the present invention. FIG. 12 shows an example of a screen to which control parameters can be set by the rate limiter 2350 included in the operation signal generating unit 2300 of the control apparatus 2200 of the thermal electric power plant 2100a.

FIG. 12 pertains to an example under which respective parameters of the increment rate and the decrement rate are set by the rate limiter 2350 of the operation signal generating unit 2300 per operation mode of the thermal electric power plant 2100a.

Next, the learning condition determining unit 2700 for determining learning parameters stored in the learning parameter database 2250 of the control apparatus 2200 shown in FIG. 8 will be described. The learning condition determining unit 2700 determines the learning parameter 2014 referred to when the learning unit 2400 performs learning.

When the learning unit 2400 performs learning, a range where the values of the model input 2017 may be varied per sampling control period, an upper limit value of the model input 2017 and a lower limit value of the model input 2017 are respectively required.

The learning condition determining unit 2700 of the control apparatus 2200 determines the learning parameter 2008 stored in the learning parameter database 2250 with reference to the control logic data 2006 stored in the control logic database 2240, the operation end specification data 2004 stored in the operation end specification database 2220, and the measurement signal data 2003 stored in the measurement signal database 2210.

Since the measurement signal cannot be obtained before the operation of the plant 2100, the learning condition determining unit 2700 determines the initial value of the learning parameter 2008 based on the control logic data 2006 and the operation end specification data 2004. After operating of the plant 2100 and obtaining the measurement signal, the learning condition determining unit 2700 updates the learning parameter 2008 using the measurement signal data 2003.

Figure 13:
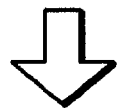
FIG. 13 is a diagram illustrating functions of a learning condition determining unit of the plant control apparatus shown in FIG. 8.

FIG. 13 is a diagram illustrating a method of determining the initial value of the learning parameter 2800 in the learning condition determining unit 2700 of the plant control apparatus 2200 according to the embodiment of the present invention.

FIG. 13 depicts data on rate limit, upper and lower limits per operation end. Values of the control logic data 2006 are reflected and displayed in the RL, LL and HL columns and values of the operation end specification data 2004 are reflected and displayed in the specification column. Values of the control logic data 2006 imply control parameters set by the rate limiter 2350 included in the operation signal generating unit 2300 shown in FIG. 11, for example. Values of the operation end specification data 2004 indicate the limit of operation speeds, the upper limit values and the lower limit values of the operation end which may be set by the operator of the plant 2100.

The learning condition determining unit 2700 selects a value that has the lowest degrees of freedom when the model input 2017 is generated from the values described in FIG. 13 and transmits the value to the learning parameter database 2250 as the initial value of the learning parameter 2008. For example, if absolute values of the increment rate and the decrement rate of the rate limit parameter are increased, the range of the mode input that can be varied per sample control period can be increased and the degrees of freedom can also be increased.

In contrast, if the absolute value of the rate limit parameter is small, the degrees of freedom can also be decreased. Accordingly, values of the increment rate and the decrement rate of the rate limit parameter of which the absolute values are small are transmitted to the learning parameter database 2250 as the initial values of the learning parameter 2008.

The degrees of freedom may be the lowest by selecting the lowest value of the upper limit value and the highest value of the lower limit value when the model input 2017 is generated.

According to an embodiment of the present invention, the initial values of the learning parameter 2008 are determined by selecting the values of which the degrees of freedom are the lowest when the model input 2017 is generated in the embodiment of the present invention, the present invention is not limited thereto; the operator can set various methods such as to directly determine the values of the operation end specification data 2004 stored in the operation end specification database 2220 as the initial values of the learning parameter 2008.

The learning condition determining unit 2700 has a function of estimating the operation mode of the present plant 2100 by processing the signal in the control logic data 2006 or the measurement signal 2003. It is possible to determine which value is currently used of the control parameters set per operation mode of the plant 2100.

A method of updating the learning parameter 2008 will be described. First, when the operation mode of the plant 2100 and the value of the control logic data 2006 are changed, the learning parameter 2008 is determined using the method described with reference to FIG. 13 based on the changed value of the control logic data 2006.

Further, the learning condition determining unit 2700 updates the learning parameter 2008 using the measurement signal data 2003 and the operation signal data 2005. A method of updating the learning parameter 2008 in the learning condition determining unit 2700 will be described with reference to FIG. 14.

Figure 14:
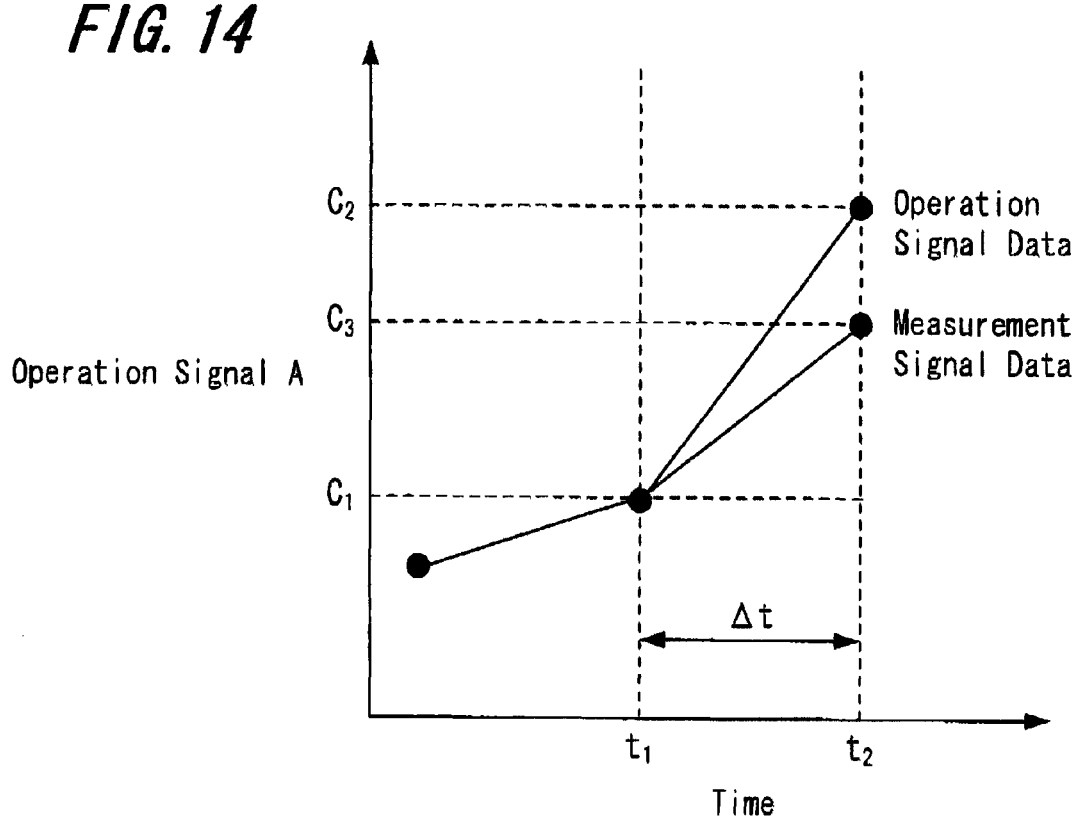
FIG. 14 is a diagram illustrating a method of updating a learning parameter of the learning condition determining unit of the plant control apparatus shown in FIG. 8.

FIG. 14 shows an example of a method of updating the learning parameter 2008 in the learning condition determining unit 2700. FIG. 14 shows the operation signal 2003 and the measurement signal data 2005 of the operation end at the respective time $t_1$ and $t_2$. In FIG. 14, $\Delta t$ represents time for one sample control period, $C_1$ represents a value of an operation signal A at time $t_1$, $C_2$ represents a value of the operation signal data 2003 at time $t_2$, and $C_3$ represents a value of the measurement signal data 2005 at time $t_2$.

As shown in FIG. 14, while the operation signal data 2003 directing the operation signal A is changed in an amount of the difference obtained from the signals $C_2$-$C_1$ in a period between the time $t_1$ and $t_2$, the measurement signal data 2005 is changed in an amount of the difference obtained by the signals $C_3$-$C_1$, and hence the range of the measurement signal data 2005 may be small as compared with that of the operation signal data 2003.

This outcome is observed when the operation signal A has a larger value with the range in the operation signal than the value in the operation limit speed per sample control period. In such a case, the value of the learning parameter 2008 with the increment rate of the operation signal A is set to the value of the difference obtained from the signals $C_3$-$C_1$.

According to the above-mentioned method, the learning condition determining unit 2700 determines the learning parameter 2008 stored in the learning parameter database 2250. The learning parameter 2008 is also updated when the operation mode is changed so that a control parameter is changed accordingly.

An example by which the learning unit 2400 of the control apparatus 2200 determines the model input 2017 for the model 2500 so that nitrogen oxide (NOx), that is, one of the model outputs 2018 outputted from the model 2500, is decreased will be explained.

It should be noted that carbon monoxide (CO), carbon dioxide, oxide sulfide, mercury, steam temperature, steam pressure and the like in addition to nitrogen oxide can be controlled to be set at desired values as the model output 2018 using the plant control apparatus 2200 according to the embodiment of the present invention.

Figure 15:
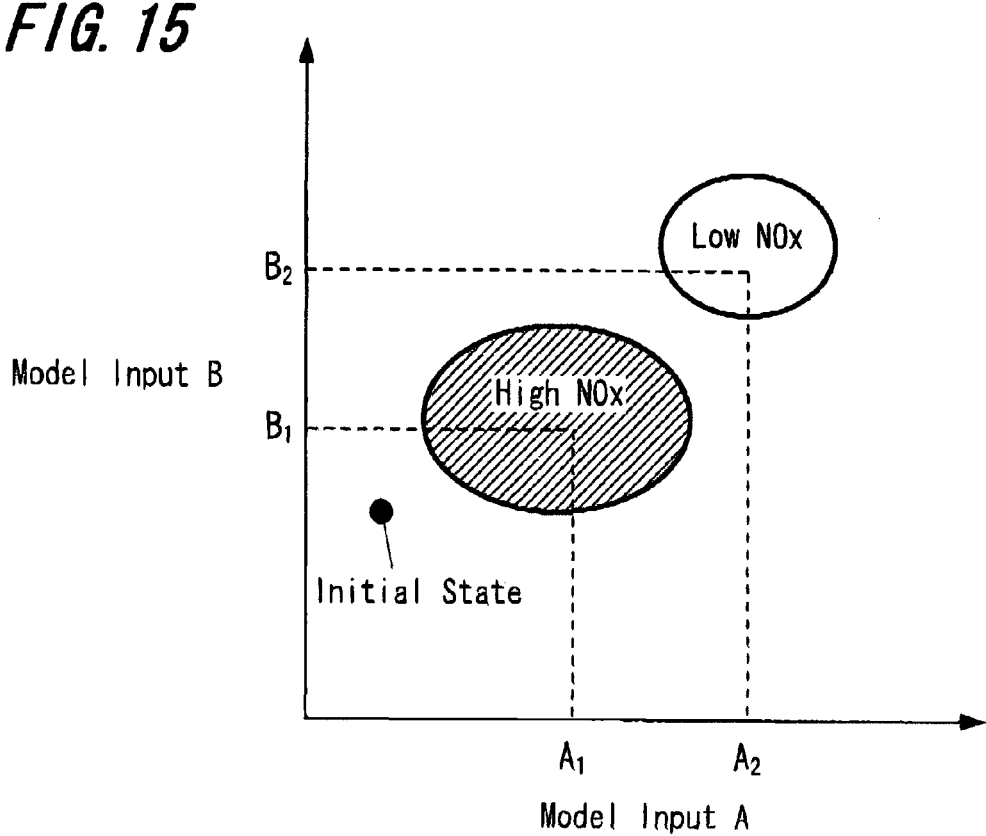
FIG. 15 is an illustrative diagram showing a relationship between a model input and a model output of a model in the plant control apparatus shown in FIG. 8.

FIG. 15 is a diagram showing a relationship between the model input 2017 inputted to the model 2500 and the model output 2018 outputted from the model 2500. It should be noted that two types of a model input A and a model input B are used as the model input 2017 and the NOx is used as the model output 2018 in FIG. 15.

As shown in FIG. 15, when the model input A is determined as $A_1$ and the model input B is determined as $B_1$, the model output 2018 has high NOx. When the model input A is determined as $A_2$ and the model input B is determined as $B_2$, the model output 2018 has low NOx. Thus, as described above, the learning unit 2400 can learn to achieve the low NOx region from the initial state.

Figure 16:
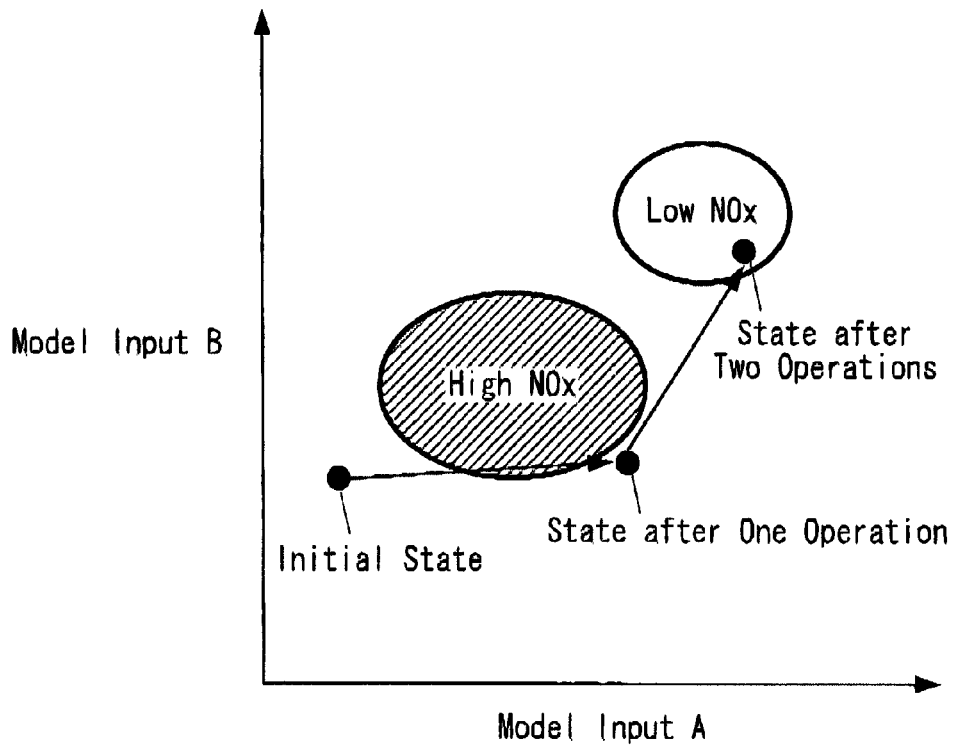
FIG. 16 is an illustrative diagram showing learned results obtained when a method of generating a model input is acquired based on a model of a learning unit of the plant control apparatus shown in FIG. 8.

FIG. 16 shows an example of results obtained when the learning unit 2400 learns to input the model based on the model. Specifically, FIG. 16 shows the results obtained when the learning unit 2400 learns to input the model under conditions where a model can achieve the low NOx region with the smallest number of operations possible and where the state is not transited to the high NOx region.

It should be noted that the model does not directly reach the low NOx region with one operation due to the limitations of the values of the model input A and the model input B which can be moved per sample control period.

The value of the model input 2017 that can be moved per sample control period is determined based on the learning parameter 2008 (learning parameter 2014) such as the increment rate and the decrement rate of the operation end which was explained with reference to FIG. 13 so that the items of the operation end correspond to the items of the model input.

FIG. 16 shows that the state has achieved the low NOx region after two operations through one operation. The learning unit 2400 has thus learned that the state can achieve the low NOx region by the two operations.

Figure 17:
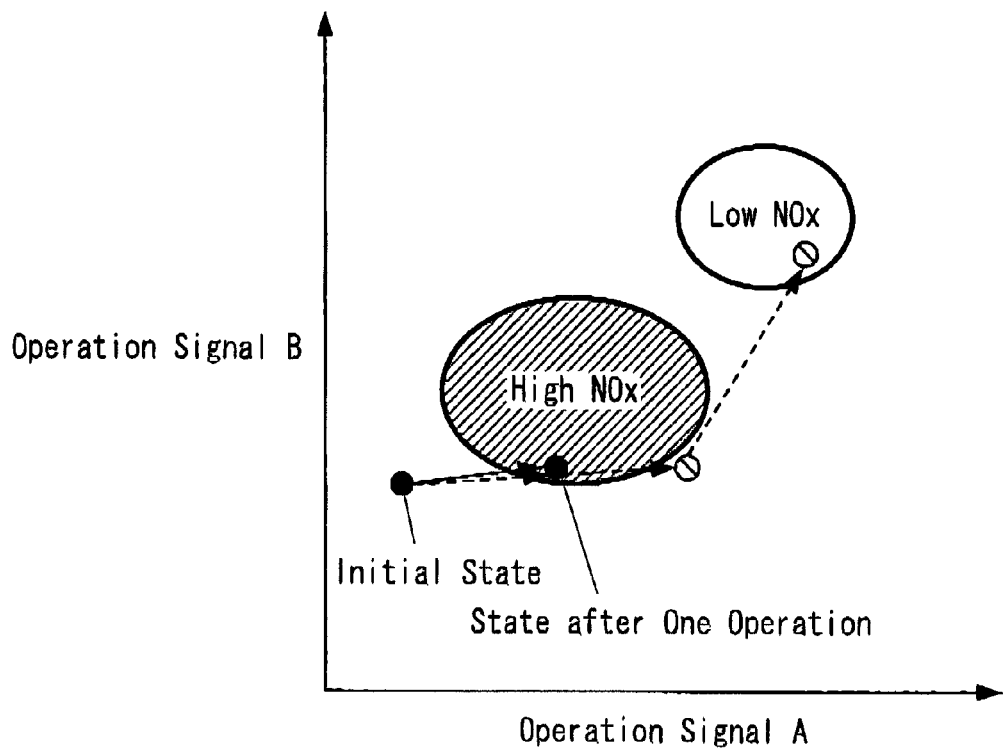
FIG. 17 is an illustrative diagram showing learned results of operation signals generated from the learning unit of the plant control apparatus shown in FIG. 8.

FIG. 17 shows a relationship between the operation signal A and the operation signal B indicating examples of results obtained when the learning unit 2400 has learned to generate the operation signal as shown in FIG. 16. In FIG. 17, the model input A corresponds to the operation signal A, and the model input B corresponds to the operation signal B, respectively.

The operation method shown by dashed arrows in FIG. 17 shows the results obtained when the learning unit 2400 of the control apparatus 2200 acquired the operation method. As shown in FIG. 17, when the operation speed of the operation signal A is low, the state transitions to the high NOx region after one operation.

This implies the possibility that the conditions set in the learning will not be satisfied if the operation signals generated are supplied to the plant 2100 when the operation limit speeds of the operation signal 2024 and the model 2017 are different, the learning unit 2400 learns to generate the model input 2017 under the conditions where the state achieves the low NOx region with the smallest number of operations possible, and when the state is not transited to the high NOx region.

According to the embodiment of the present invention, in order to avoid such outcome, the following methods are applied. Specifically, the control apparatus 2200 includes the learning condition determining unit 2700. This learning condition determining unit 2700 determines the learning parameter 2008 including the operation limit speed of the operation end of the plant 2100 as mentioned hereinbefore and the learning parameter 2008 is stored in the learning parameter database 2250. The learning unit 2400 performs learning provided that the operation limit speeds of the operation signal 2024 and the model input 2017 agree with each other with reference to the learning parameter 2014 stored in the learning parameter database 2250.

Next, control operations of the control apparatus 2200 will be described with reference to a flowchart shown in FIG. 18.

Figure 18:
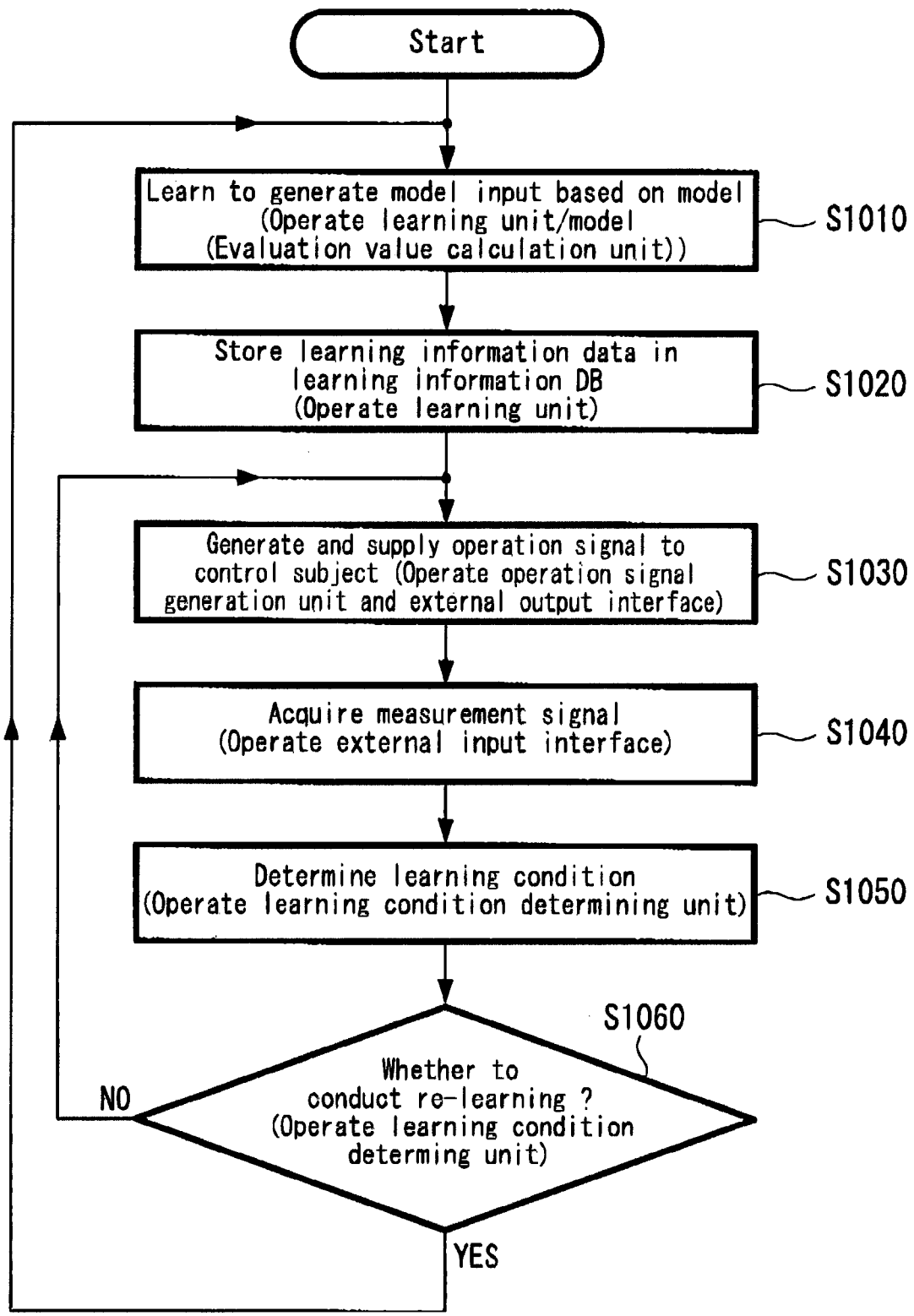
FIG. 18 is a flowchart showing operation processing steps of the plant control apparatus according to an embodiment of the present invention.

FIG. 18 is a flowchart showing the operation processing on the plant model simulation and descriptions of the plant model simulation of the plant control apparatus 2200 in the embodiment of the present invention shown in FIG. 8.

The flowchart of the control operation of the control apparatus 2200 shown in FIG. 18 can be applied to the case in which the control apparatus 2200 is not provided with the learning information adding unit 2800 described with reference to FIG. 8. Operation contents of the learning information adding unit 2800 and a flowchart conducted when the control apparatus 2200 includes the learning information adding unit 2800 will be described later.

As shown in FIG. 18, the flowchart of the control operation of the control apparatus 2200 may be conducted with combinations of the steps 1010, 1020, 1030, 1040, 1050 and 1060. The respective steps 1010, 1020, 1030, 1040, 1050 and 1060 will be described below.

First, at step 1010, the learning unit 2400 and the model 2500 are activated to learn to generate the model input 2017 with which the model output 2018 can achieve the model output setpoint value.

It should be noted that the evaluation value calculating unit 2600 can learn whether or not the model output 2018 achieves the model output setpoint value based on the evaluation value calculation parameter 2015. Alternatively, the evaluation value calculating unit 2600 can learn whether or not the model output 2018 approximates the model output setpoint value based on the evaluation value 2019 showing a quantitatively evaluated value.

The evaluation value calculation parameter database 2260 stores parameters such as the model output setpoint value necessary to calculate the evaluation value 2019. Optimization methods such as a genetic algorithm, a dynamic programming and a reinforcement learning method can be applied to learning.

At step 1020, the learning unit 2400 is activated to transmit a learned result at step 1010 from the learning unit 2400 to the learning information database 2280 as the learning information data. The learning information data 2020 is used as a function required for generating the model input 2017 from the model output 2018, for example.

At step 1030, the operation signal generating unit 2300 is activated to generate the operation signal 2023. The operation signal 2023 is transmitted to the operation signal database 2230 and the external output interface 2202, and the operation signal 2024 is supplied from the external output interface 2202 to the plant 2100 as a control instruction.

At step 1040, the external input interface 2201 is activated to allow the measurement signal 2001 directing the control output of the plant 2100 to be obtained in the control apparatus 2200 and to allow the measurement signal 2002 to be transmitted to the operation signal generating unit 2300 and the measurement signal database 2210.

At step 1050, the learning condition determining unit 2700 determines the learning parameter 2008 directing the learning condition and transmits the learning parameter 2008 to the learning parameter database 2260.

Then, at the next decision step 1060, the learning condition determining unit 2700 is activated to compare the learning parameter 2009 directing the preceding value of the learning parameter stored in the learning parameter database 2250 with the learning parameter 2008. If the values of the learning parameter 2009 and the learning parameter 2008 are same as shown by a YES at the decision step 1060, the learning trigger signal 2007 is set to "0". If, on the other hand, the values of the learning parameter 2009 and the learning parameter 2008 are different, as shown by a NO at the decision step 1060, the learning trigger signal 2007 is set to "1" and transmitted to the learning unit 2400.

Setting the learning trigger signal 2007 to "1" implies that the value of the learning parameter is changed, and the current step goes back to the step 1010 and learning is performed using the new learning parameter 2014. This learning is referred to as "re-learning".

It should be noted that the learning unit 2400 can perform re-learning using the learning information data 2021 indicating the preceding learned result. If the learning trigger signal is set to "0" and re-learning is not performed, and the current step goes back to the step 1030.

Figure 19:
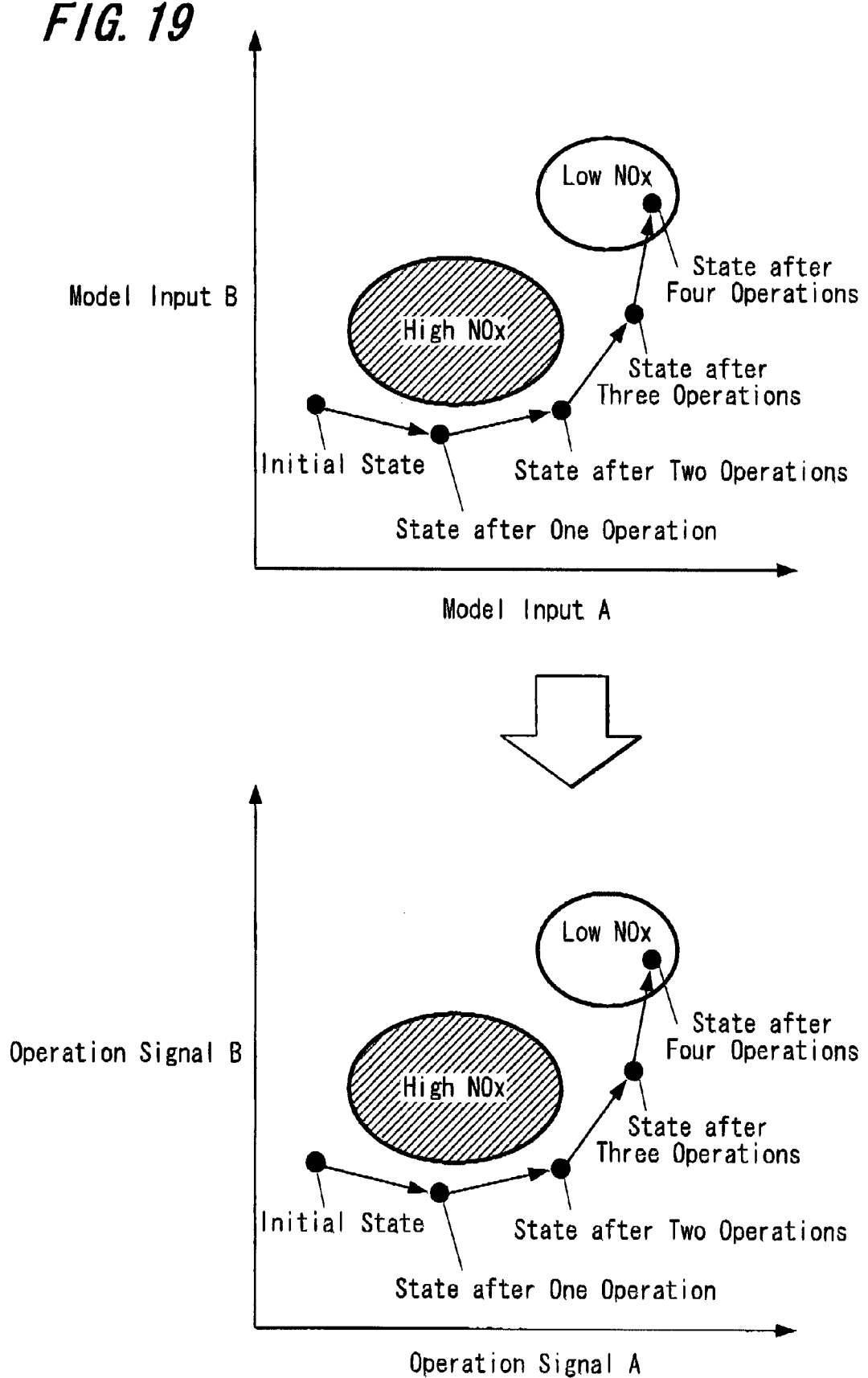
FIG. 19 is a diagram showing learned results of model inputs and operation signals which are learned based on the flowchart shown in FIG. 18.

FIG. 19 is a diagram illustrating learning effects using the operation method shown in the flowchart of the control operation performed by the control apparatus 2200 according to the embodiment of the present invention shown in FIG. 18.

As shown in FIG. 19, having accounted for the operation limit speed of the operation signal 2024, the learning condition determining unit 2700 of the control apparatus 2200 determines the operation limit speed of the model input 2017 as the learning parameter 2008. Accordingly, when the model 2500 of the control apparatus 2200 is used to supply the operation signal 2024 directing the control instruction to the plant 2100 in accordance with the method (upper diagram of FIG. 19) of generating the model input 2017 learned by the learning unit 2400, the state can achieve the low NOx region from the initial state after four operations without transiting to the high NOx region as shown in the lower diagram of FIG. 19.

In addition, when there is variability in the actual operation speeds although a plurality of operation ends having the same design specification data are used, the learning unit 2400 can learn operation speeds with consideration of operation limit speeds of individual operation ends. When the operation end deteriorates and lowers the operation speed due to aging, the lowered operation speed can be set as the learning condition.

Further, when the plant operation state such as the power output changing operation, the burner switching operation, and the coal type switching operation is changed to change the control parameters of the rate limiter and the like, the learning unit 2400 can learn under the changed conditions. Alternatively, when the operator of the plant 100 changes the control parameter, learning can be conducted in accordance with the changed condition.

As a result, the operation signal 2024 generated in accordance with the generating method of the learned model input 2017 is supplied to the plant 2100 as the control instruction, thereby obtaining desired control results as plant control.

Since the learning condition determining unit 2700 of the control apparatus 2200 automatically determines the learning constraint conditions, the operator of the plant need not determine the learning constraint conditions so that the control apparatus can be used more efficiently and a condition setting period for learning can be reduced.

As shown in FIG. 18, in the flowchart of the control operation of the control apparatus 2200, if the learning condition determining unit 2700 determines the learning parameter to be different from the preceding value, the re-learning should be performed at step 1010. Since this learning requires the computation resources, a control apparatus capable of high-speed calculation should be used or learning should be conducted with sufficient time.

The use of the control apparatus capable of high-speed calculation may be costly. When the learning is conducted with sufficient time, the operation of the learning signal generating unit 2310 should be stopped during learning so that results learned by the learning unit 2400 and the model 2500 cannot be reflected to the generation of the operation signal 2024.

Therefore, according to the embodiment of the present invention, the control apparatus 2200 shown in FIG. 8 includes the learning information adding unit 2800 as solutions. If the learning trigger signal 2007 is set to the learning information adding unit 2800 generates the learning information data 2013 using the learning parameter data 2014 and the learning information data 2012, and transmits the learning information data 2013 to the learning information database 2280. When the learning unit 2400 uses the learning information adding unit 2800, the learning unit 2400 can generate the learning information data 2013 of the learned result obtained when the learning parameter 2014 is used as the learning condition without re-learning.

Accordingly, the control apparatus capable of the high-speed operation need not be used where the learning parameter 2014 is changed in the learning condition determining unit 2700, or the function of the learning signal generating circuit 2310 will not stop where the learning parameter 2014 is changed by the learning condition determining unit 2700.

Next, control operation conducted when the control apparatus 2200 includes the learning information adding unit 2800 will be described with reference to a flowchart shown in FIG. 20.

Figure 20:
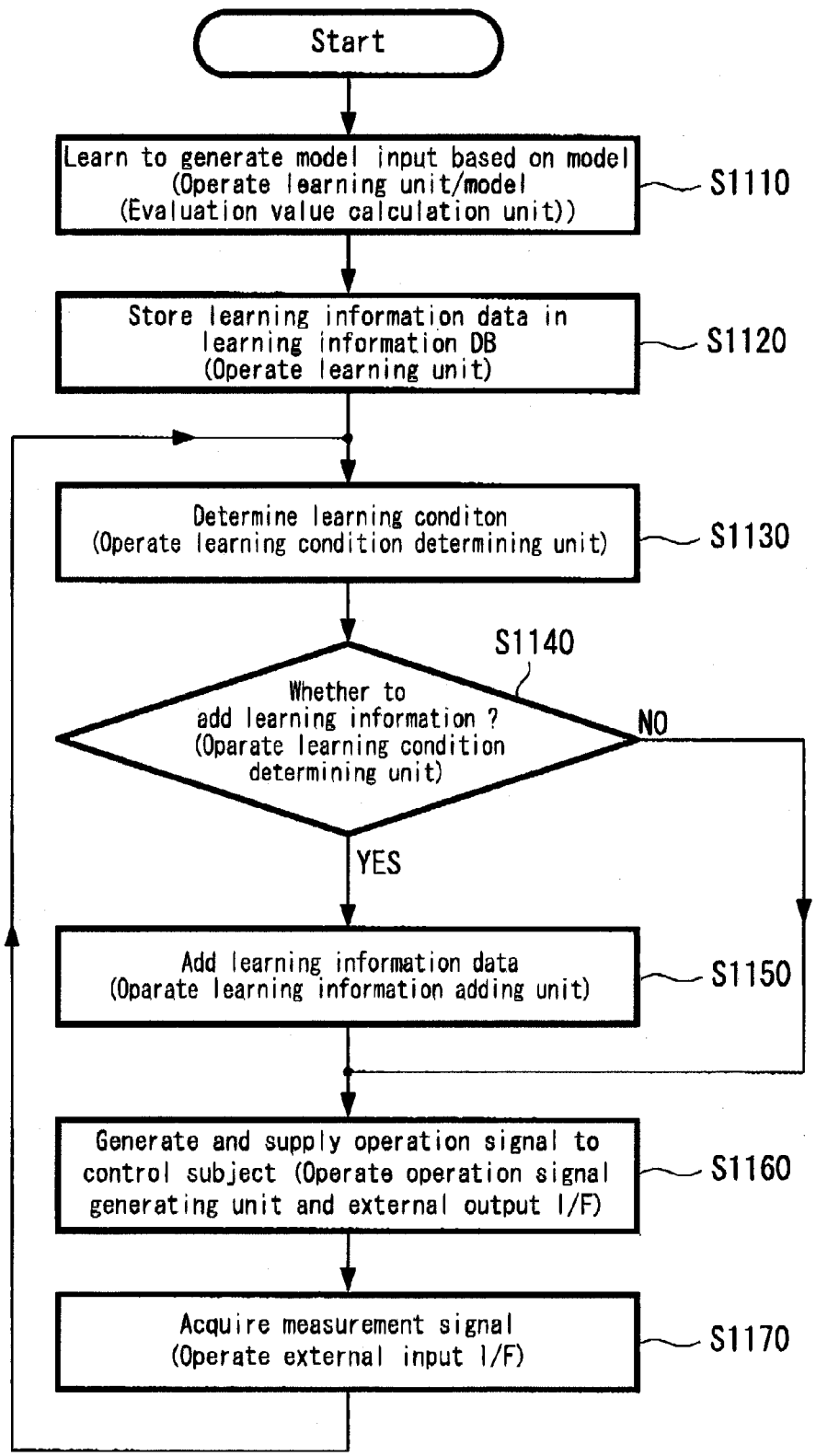
FIG. 20 is a flowchart showing operation processing steps when a learning information adding unit is installed in the plant control apparatus according to the embodiment of the present invention.

FIG. 20 is a flowchart showing the operation processing description on the model simulation and descriptions of learning of the plant under control of the control apparatus 2200 when the plant control apparatus according to the embodiment of the present invention includes the learning information adding unit 2800.

As shown in FIG. 20, the flowchart of the control operation of the control apparatus 2200 is performed with combinations of steps 1110, 1120, 1130, 1140, 1150, 1160 and 1170. The respective steps 1110, 1120, 1130, 1140, 1150, 1160 and 1170 will be described.

First, at step 1110, the learning unit 2400 learns to generate the model input 2017 with which the model output 2018 may achieve the model output setpoint value based on the model 2500. It should be noted that the learning unit 2400 can learn to generate the model input 2017 using the evaluation value calculating unit 2600 in a manner similar to the step 1010 of the flowchart shown in FIG. 18. The optimization method can also be used in a manner similar to step 1010.

When the learning unit 2400 learns to generate the model input 2017 at step 1110, learning is performed in conditions in which the input space is divided into regions using the minimal setting value of the range of the model input 2017. The minimal setting value of the range of the model input 2017 is set by the operator of the plant 2100.

Figure 21:
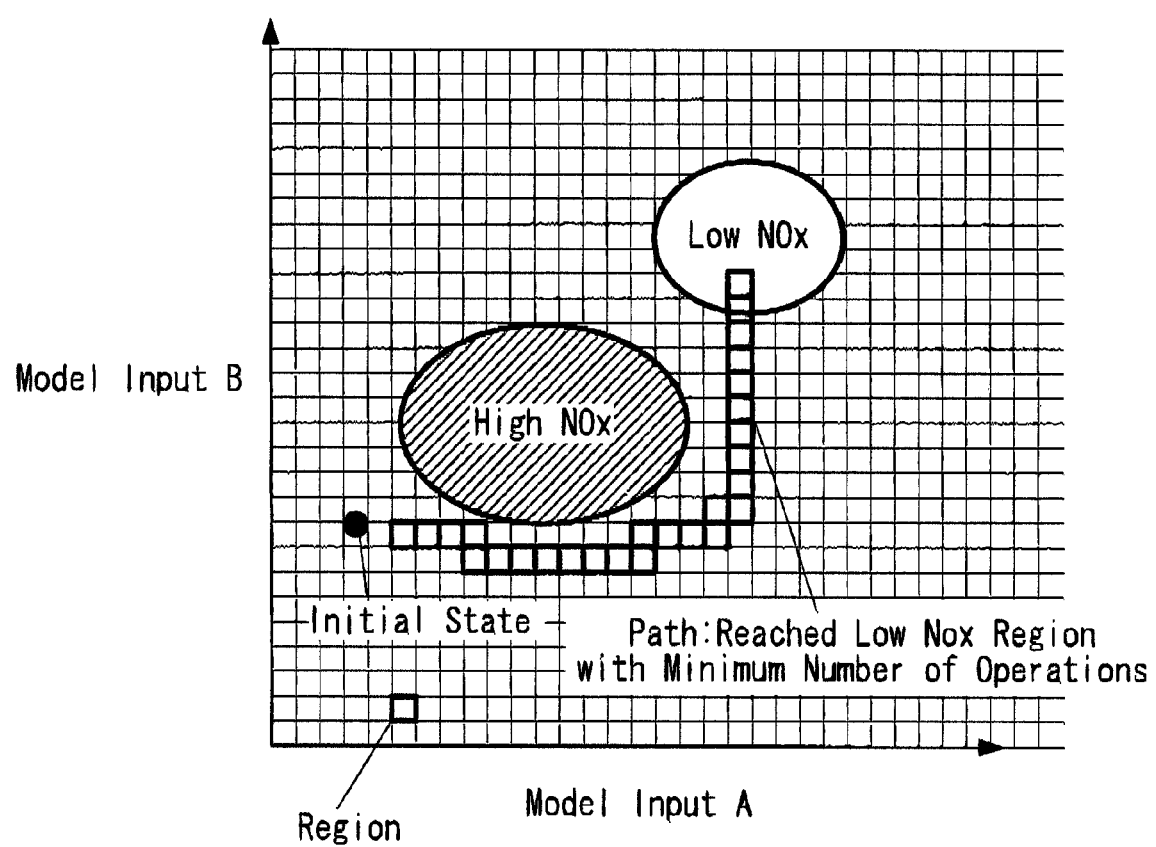
FIG. 21 is a diagram illustrating a method of dividing an input space of a model input acquired based on the flowchart shown in FIG. 20 into regions.

FIG. 21 is an illustrative diagram showing the case in which an input space is divided into regions when a method of generating a model input 2017 is acquired in the learning unit 2400 at step 1110.

As shown in FIG. 21, the learning unit 2400 divides the widths of the operable ranges of the model inputs A and B into the minimal setting values of the model input range. Next, the width of the range of the model input changed by one operation is limited to the minimal setting value of the model input range and learning is conducted.

That is, in individual region, the learning unit 2400 can learn the operation method to move to the adjacent region. For example, when the operation is started from the initial state using the results learned under the condition where the number of operations is minimum and that the state is not transited to the high NOx region, the state achieves the low NOx region through the path shown in FIG. 21; that is, the path through which the state can achieve the low NOx regions by the smallest number of operations.

At step 1120, the learning unit 2400 is activated and the learning unit 2400 transmits the learned result of the step 1210 to the learning information database 2280 as the learning information data 2020.

At step 1130, the learning condition determining unit 2700 is activated to determine the learning condition, and the learning parameter 2008 is transmitted to the learning parameter database 2250.

At step 1140, the learning condition determining unit 2700 compares the learning parameter 2009 of the preceding value of the learning parameter stored in the learning parameter database 2250 with the learning parameter 2008. If the two values are equal, the learning trigger signal 2007 is set to "0". If, on the other hand, the two values are different, the learning trigger signal 2007 is set to "1". If the learning trigger signal 2007 remains at "1", the current step moves to the step 1150. If, on the other hand, the learning trigger signal remains at "0", the current step moves to the step 1160.

At step 1150, the learning information adding unit 2800 is activated to generate the added learning information data using the learning information data 2012 stored in the learning information database 2280 and the learning parameter 2010 stored in the learning parameter database 2250 and transmits the added learning information data 2013 to the learning information database 2280.

It should be noted that the learning information data 2012 used at step 1150 is the result obtained when the learning unit 2400 learned at step 1110.

Next, control operations of the learning information adding unit 2800 provided in the control apparatus 2200 will be described.

Figure 22:
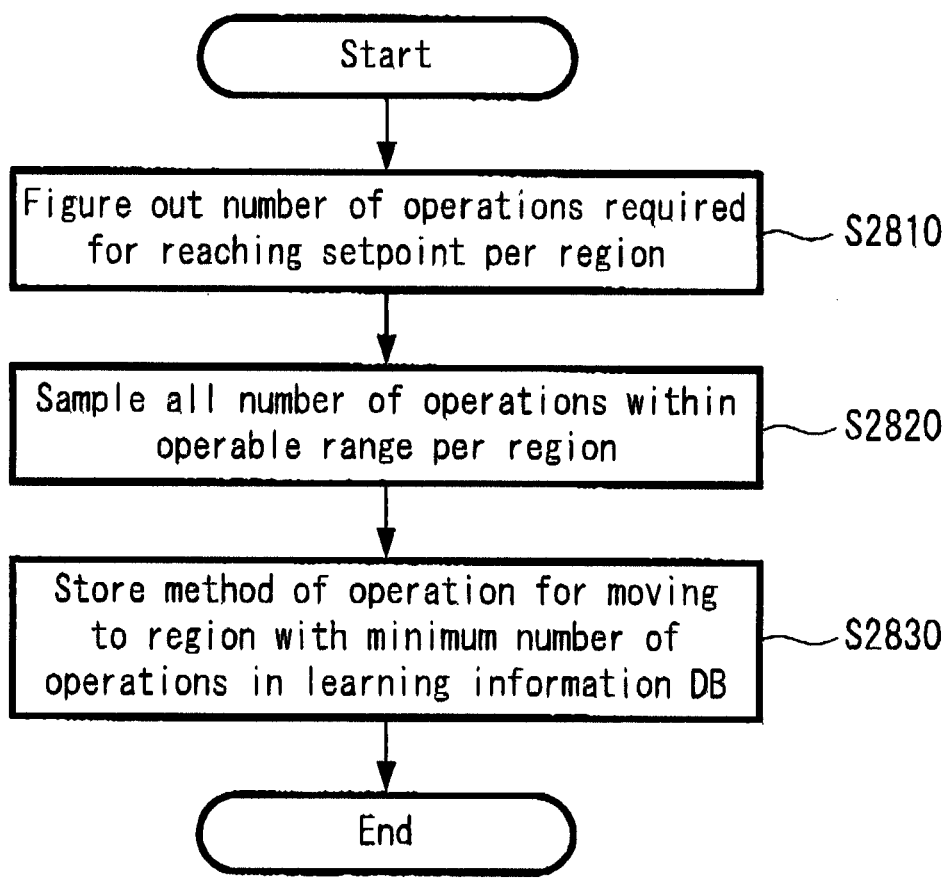
FIG. 22 is a flowchart showing a detailed description of step 1150 in the flowchart shown in FIG. 20.

FIG. 22 is a flowchart illustrating the description of operations of the learning information adding unit 2800 provided in the control apparatus 2200 shown in FIG. 8. More specifically, FIG. 22 is a flowchart illustrating the detailed operations of the step 1150 in the flowchart shown in FIG. 20.

As shown in FIG. 22, at step 2810, the number of operations required for reaching the setpoint state per region is obtained using the learning information data 2012 using the learning information data 2012 indicating the learned results obtained at step 1110. The number of operations can be obtained by calculating the number of operations from the initial state to the setpoint state in all regions.

At step 2820, the learning parameter 2010 is used to determine the range (operation possible range) in which the state can be changed by one operation per region and all values in the number of operations numbers calculated at step 2810 are sampled from the regions within the operation allowable range.

At step 2830, the optimum operation method is defined as an operation method of transiting to the region where the value obtained from the number of operations sampled at step 2820 is minimal, and the method is transmitted from the learning information adding unit 2800 to the learning information database 2280 as the added learning information data 2013.

Figure 23:
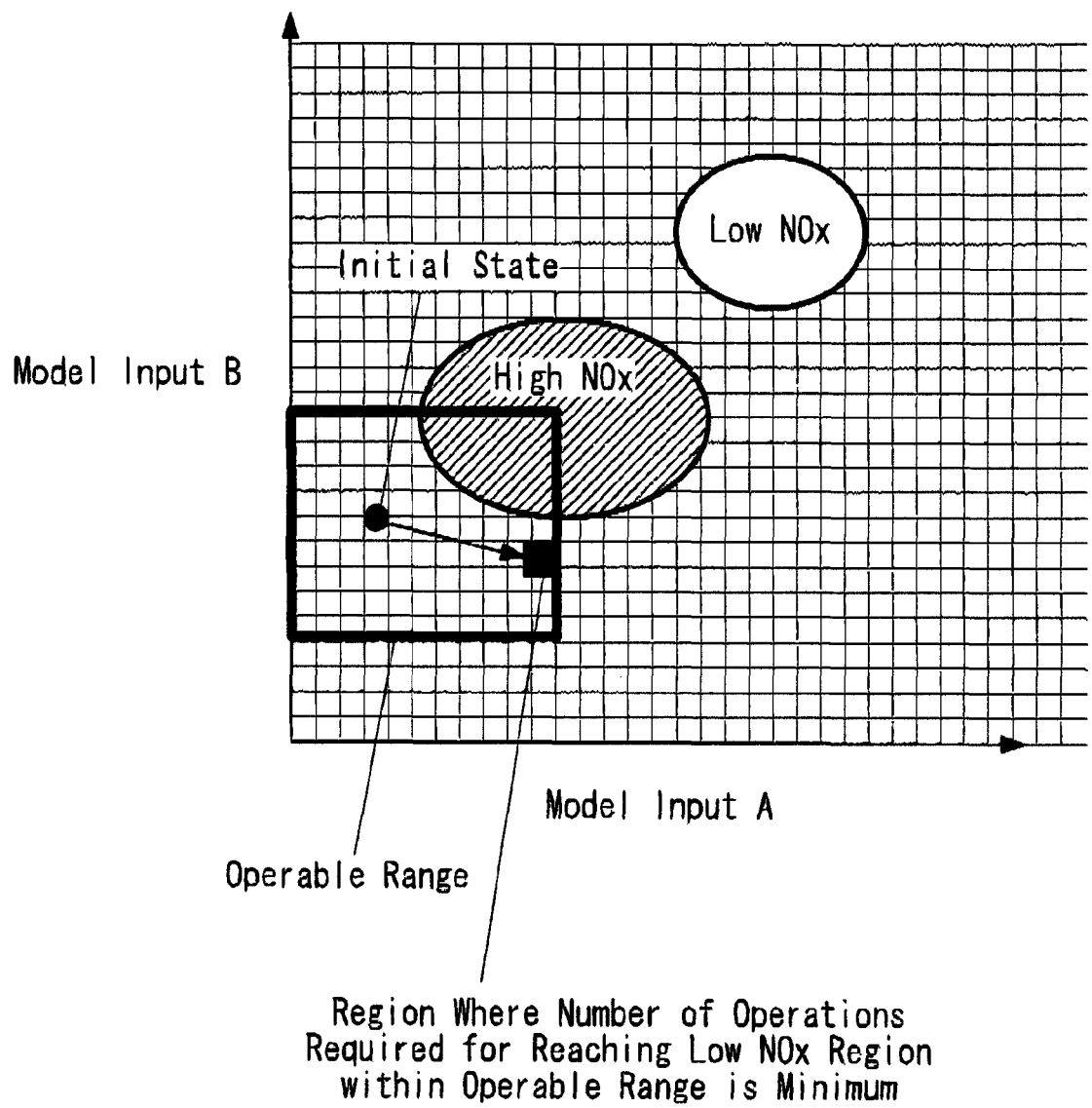
FIG. 23 is a diagram illustrating learned results obtained using the flowchart shown in FIG. 22.

FIG. 23 is a diagram illustrating learned results at the flowchart of FIG. 22, depicting the operational descriptions of the learning information adding unit 2800. As shown in FIG. 23, operations shown by arrows in FIG. 23 are included in the added learning information data generated by the learning information adding unit 2800.

When the learning information adding unit 2800 is operated by following the arrows from the initial state shown in FIG. 23, the state can reach the region where the number of operations required for achieving the lowest NOx region of the operation allowable range in the initial state.

The above-described descriptions are illustration of the operations at step 1150 shown in FIG. 20.

Referring back to FIG. 20, at step 1160, the operation signal generating unit 2300 is activated to generate the operation signal 2023 using the learning information data 2022 generated at step 1150 and the control logic data 2011. The operation signal 2023 is transmitted to the plant 2100 through the external output interface 2202 as the operation signal 2024 directing the control instruction.

At step 1170, the external input interface 2201 is activated to obtain the measurement signal 2001 directing the control output of the plant 2100 inside of the control apparatus 2200. The current step then moves to the step 1130, and the operations of the above-mentioned steps 1130 to 1170 are repeated.

In the flowchart illustrating the control operation of the control apparatus 2200 shown in FIG. 18, when the learning trigger signal 2007 of the leaning condition determining unit 2700 in the control apparatus 200 is set to "1", re-learning is required at the next step 1010.

On the other hand, in the flowchart of FIG. 20 showing the control operations of the control apparatus 2200, when the learning trigger signal 2007 is set to "1", the learning information adding unit 2800 is activated by the result learned at step 1110 to generate the same learning information data obtained when the learning unit 2400 learns to generate the model input 2017 in the condition where the learning parameter 2014 (learning parameter 2010) is set to the learning condition.

As a result, in addition to the effects achieved by using the flowchart shown in FIG. 18, the effect of enabling the control the plant 2100 without stopping the function of the learning signal generating unit 2310 can be obtained when the control apparatus capable of high-speed operation is unused.

As the effects achieved by the embodiments where the plant control apparatus and the control method are applied to the thermal electric power plant according to the present invention, the effect of decreasing the concentration of NOx in the exhaust gas discharged from the thermal electric power plant can be given.

Further, the amount of ammonia required for decreasing NOx using the NOx removal equipment is decreased as well as redugcing the concentration of Nox so that the effect obtained by catalytic activity in the NOx removal equipment can be maintained for a long period of time.

According to the plant control apparatus according to the embodiments of the present invention, the initial value of the learning parameter used for determining the learning constraint condition can be determined using the advance information (specification) concerning the operation limit speed of the operation end. Also, since this learning parameter is successively corrected by using the measurement signal, the operation speed of the operation end of the plant can be reflected on the learning parameter.

For example, there is variability in the actual operation speeds when using a plurality of operation ends having the same specification, learning can be conducted having accounted for the operation speed of individual operation end. When the operation end deteriorates and lowers the operation speed due to aging, the learning can be conducted in the condition where the lowered operation speed is used as the constraint condition and the plant can efficiently be controlled, thereby safely operating the plant.

Since the operator of the plant need not determine the learning constraint condition using the plant control apparatus according to the embodiments of the present invention, manageability of the control apparatus can be increased and the period of the condition setting for learning can be decreased.

The present invention can be applied to a control apparatus for a plant such as a thermal electric power plant and a plant control method.

Having described preferred embodiments of the invention with reference to the accompanying drawings, it is to be understood that the invention is not limited to those precise embodiments and that various changes and modifications could be effected thereby by one skilled in the art without departing from the spirit or scope of the invention as defined in the appended claims.

What is claimed is:

1. A control apparatus comprising:
   a processing unit; and
   memory unit,
   wherein the processing unit includes a learning unit which generates an operation signal applied to a control subject and a model that simulates characteristics of the control subject, receives an evaluation value signal calculated based on a measurement signal obtained by applying the operation signal to the control subject and the model, and performs learning to generate the operation signal such that an expected value of a sum of the evaluation value signals obtained from a present state to a future state is either maximum or minimum;
   wherein the evaluation value signal calculated based on the measurement signal from the model is calculated by adding a first evaluation value obtained based on a deviation between the measurement signal obtained from the model and a setpoint value retrieved from said memory unit, and a second evaluation value obtained based on a difference in characteristics between the model and the control subject.

2. A control apparatus according to claim 1, wherein the second evaluation value includes at least one of a value calculated with reference to a model error characteristic database where a relationship between an operation signal and a modeled error is stored, a value calculated with reference to a process value database where a relationship between an operation signal and an evaluation value signal calculated based on a measurement signal obtained by the application of the operation signal to a control subject, and a value calculated with reference to a database where characteristics of a preliminary modeled error are stored.

3. A control apparatus according to claim 2, wherein the second evaluation calculating unit conducts respective processing including model error bias calculation processing, model error variance calculation processing, evaluation value prediction error calculation processing, measurement value error calculation processing, and second evaluation value calculation processing.

4. A control apparatus according to claim 3, further comprising:
   image display means,
   wherein the image display means displays values of error evaluation vectors obtained with reference to a model error characteristic database, an evaluation value database and a process value database, a value of a weight vector set by an operator, and a second evaluation value.

5. A control apparatus according to claim 1, further comprising:
   means for initializing a value function to represent a value where a specific action is conducted in a state determined by an operation signal and an output;
   means for determining an initial value of an operation signal of a model and calculating a model output obtained at the initialization;
   means for determining the action using the value function and updating an operation signal based on the action;
   means for calculating a model output for the updated operation signal;
   means for calculating an evaluation value signal based on the first evaluation value calculated by a first evaluation value calculating unit and the second evaluation value calculated by a second evaluation value calculating unit; and
   means for updating the value function using the calculated evaluation value signal.

6. A control apparatus according to claim 5, wherein the second evaluation calculating unit conducts respective processing including model error bias calculation processing, model error variance calculation processing, evaluation value prediction error calculation processing, measurement value error calculation processing, and
   second evaluation value calculation processing.

7. A control apparatus according to claim 6, further comprising:
   image display means,
   wherein the image display means displays values of error evaluation vectors obtained with reference to a model error characteristic database, an evaluation value database and a process value database, a value of a weight vector adjusted to set by an operator, and a second evaluation value.

8. A control method implemented in a control apparatus including a processing unit and memory, said control method comprising:
   generating, by said processing unit, an operation signal applied to a control subject and a model that simulates characteristics of the control subject, receiving, in said processing unit, an evaluation value signal calculated based on a measurement signal obtained by applying the operation signal to the control subject and the model, and learning, by said processing unit, to generate the operation signal such that an expected value of the sum of the evaluation value signals obtained from a present state to a future state is either maximum or minimum;

wherein the evaluation value signal derived from the measurement signal from the model is calculated by adding a first evaluation value obtained based on a deviation between the measurement signal obtained from the model and a setpoint value retrieved from said memory, and a second evaluation value obtained based on a difference in characteristics between the model and the control subject.

9. A control method according to claim 8, wherein the second evaluation value includes at least one of a value calculated with reference to a model error characteristic database where a relationship between an operation signal and a modeled error is stored, a value calculated with reference to a process value database where a relationship between an operation signal and an evaluation value signal calculated based on a measurement signal obtained by the application of the operation signal to a control subject, and a value calculated with reference to a database where characteristics of a preliminary modeled error are stored.

10. A control method according to claim 8, comprising:
initializing a value function to represent a value where a specific action is conducted in a state determined by an operation signal and an output;
determining an initial value of an operation signal of a model and calculating a model output obtained at the initialization;
determining the action using the value function and updating an operation signal based on the action;
calculating a model output for the updated operation signal;
calculating an evaluation value signal based on a first evaluation value obtained based on a deviation between the measurement signal obtained from the model and a setpoint value, and a second evaluation value obtained based on a difference in characteristics between the model and the control subject; and
updating the value function using the calculated evaluation value signal, wherein
wherein the respective steps are repeatedly conducted until an output of the model satisfies previously-determined conditions.

11. A plant control apparatus comprising:
a processing unit; and
a memory unit,
wherein said processing unit includes:
an operation signal generating unit which calculates an operation signal directing a control instruction that is applied to a plant using a measurement signal indicating plant operation state quantityl, and
a model for simulating control characteristics of a plant as a control subject,
wherein said memory unit includes:
a control logic database in which control logic data including control parameters used by the operation signal generating unit to calculate an operation signal are stored,
a learning information database in which learning information data are stored, an operation end specification database in which operation end specification data of an operation end for controlling plant state quantity are stored;
an operation signal database in which previous operation signals are stored, and
a measurement signal database in which previous measurement signals are stored,
wherein said processing unit further includes:
a learning condition determining unit having a function of determining an initial value of a learning parameter using data stored in the control logic database and the operation end specification database and a function of updating the learning parameter using data stored in the control logic database, the operation signal database and the measurement signal database, and
a learning unit for setting a limit value of an operation signal range per unit time included in learning parameters to a learning constraint condition and learning to operate the plant using the model, thereby generating learning information data to be stored in said learning information database,
wherein the operation signal generating unit includes a learning signal generating unit for calculating a plant operation signal using a measurement signal indicating operation state quantity of the plant and learning information data stored in a learning information database.

12. A plant control apparatus according to claim 11, said processing unit further comprising:
a learning information adding unit which estimates learning information data obtained when the learning unit performs learning under a condition in which a limit value of an operation signal range per unit time included in learning parameters is set to a learning constraint condition using learning information data stored in the learning information database and transmits added learning information data obtained as estimated results to the learning information database.

13. A plant control apparatus according to claim 11, wherein the learning condition determining unit of the control apparatus has a function of comparing a parameter set for limiting a signal range per unit time of control parameters stored in the control logic database with a value of an operation speed of an operation end stored in the operation end specification database and setting a value having a small absolute value to an initial value of the learning parameter.

14. A plant control apparatus comprising:
an operation signal generating unit for calculating an operation signal directing a control instruction that is applied to a thermal electric power plant using a measurement signal indicating thermal electric power plant operation state quantity;
a model for simulating control characteristics of a thermal electric power plant as a control subject;
a control logic database in which control logic data including control parameters used by the operation signal generating unit for calculating an operation signal are stored;
an operation end specification database in which operation end specification data of an operation end for controlling thermal electric power plant state quantity are stored;
an operation signal database in which previous operation signals are stored;
a measurement signal database in which previous measurement signals are stored;
a learning condition determining unit having a function of determining an initial value of a learning parameter using data stored in the control logic database and the operation end specification database and a function of updating the learning parameter using data stored in the control logic database, the operation signal database and the measurement signal database;

a learning unit for setting a limit value of an operation signal range per unit time included in learning parameters to a learning constraint condition and learning to operate the thermal electric power plant using the model; and a learning information database in which learning information data acquired at the learning unit are stored, wherein the operation signal generating unit includes a learning signal generating unit for calculating a thermal electric power plant operation signal using a measurement signal indicating operation state quantity of the thermal electric power plant and learning information data stored in a learning information database.

15. A plant control apparatus according to claim 14, further comprising:

means for determining learning parameters by updating the learning parameter based on the estimated result of whether or not the thermal electric power plant performs operation including at least one of burner switching operation, coal type switching operation and load changing operation using data including the measurement signals for measuring concentration of at least one of carbon monoxide, carbon dioxide, oxide sulfide and mercury, and the operation signals for determining at least one of an aperture of an air damper, an air flow rate and a fuel flow rate stored in the control logic database, the operation signal database and the measurement signal database in the learning condition determining unit, and means for determining learning parameters by updating the learning parameter based on the estimated result regarding an operation speed of the operation end using data including stored in the operation signal database and the measurement signal database.

16. A plant control apparatus according to claim 15, further comprising:

a learning information adding unit having a function of estimating learning information data obtained when the learning unit performs learning under a condition in which a limit value of an operation signal range per unit time included in learning parameters is set to a learning constraint condition using learning information data stored in the learning information database and a function of transmitting added learning information data obtained as estimated results to the learning information database, wherein the learning signal generating unit of the operation signal generating unit calculates an operation signal using added learning information data stored in said learning information database.

17. A plant control apparatus according to claim 16, wherein the learning unit of the control apparatus is configured such that the learning unit has a function of setting a learning constraint condition to operate the operation end only in the regions from the adjacent regions in the operation regions that are divided in accordance with preliminary set operation regions and a function of calculating the number of operations required by the model output indicating the estimated result obtained by model simulation so as to reach the region in which a setpoint value is achieved, and wherein the learning information adding unit of the control apparatus is configured such that the learning information adding unit has a function of setting an operation method in a certain region of the operation region of an operation end divided into the preliminary set regions as a method where the model output moves to a region in which the number of operations is minimum in the region which the model output can reach after a unit time.

18. A plant control apparatus according to claim 14, further comprising:

a user interface for setting control parameters used in the control apparatus per ordinary operation, burner switching operation, coal type switching operation or load changing operation which are used as the operation modes of the thermal electric power plant.

19. A plant control method of calculating an operation signal directing a control instruction supplied to a plant using a measurement signal indicating plant operation state quantity for controlling the plant implemented in a control apparatus including a processing unit and memory, said control method comprising the steps of:

forming, in said processing unit, a model simulating control characteristics of a plant indicating a control subject by a control apparatus of the plant;

storing, in said memory, control logic data including control parameters used for calculating the operation signal in a control logic database of the control apparatus;

storing, in said memory, operation end specification data of an operation end for controlling plant state quantity in an operation end specification database;

storing, in said memory, previous operation signals in an operation signal database;

storing, in said memory, previous measurement signals in a measurement signal database;

determining, by the processing unit, an initial value of a learning parameter by using data stored in a control logic database and an operation end specification database;

updating, by the processing unit, a learning parameter using data stored in the control logic database, the operation signal database and the measurement signal database;

setting, by the processing unit, a limit value of an operation signal range per unit time contained in the learning parameter to a constraint condition and using said model to simulate plant characteristics to learn a plant operation method; and storing, in said memory, learning information data indicating learned results in the learning information database, wherein an operation signal directing a control instruction applied to the plant is calculated using the measurement signal indicating the plant operation state quantity and the learning information data stored in the learning information database.

20. A plant control method according to claim 19, further comprising the steps of:

estimating learning information data obtained when learning is conducted in the condition in which a limit value of an operation signal range per unit time included in the learning parameter is set to a constraint condition using learning information data stored in the learning information database when a plant operation method is learned by simulating characteristics of the plant, and calculating an operation signal directing a control instruction applied to the plant by adding added learning information data indicating the estimated result to the learning information data of the learning information database to thereby control the plant.

21. A plant control method according to claim 19, further comprising the steps of:

comparing a parameter set for limiting a signal range per unit time of control parameters stored in the control logic database with a value of an operation speed of an operation end stored in the operation end specification database, and setting a value having a small absolute value to an initial value of the learning parameter.

22. A plant control method according to claim 19, further comprising the steps of:

dividing the operation regions into preliminary set operation regions, setting a learning constraint condition so as to operate the operation end only in the region from the adjacent regions in the operation regions, calculating the number of operations required by the model output so as to reach the region in which a setpoint value is achieved, and setting an operation method in a certain region of the operation region of an operation end divided into the preliminary set regions as a method in which the model output moves to a region where the number of operations is minimum in the region which the model output can reach after a unit time.

23. A plant control method of calculating an operation signal directing a control instruction supplied to a thermal electric power plant using a measurement signal indicating thermal electric power plant operation state quantity for controlling the thermal electric power plant implemented in a control apparatus including a processing unit and memory, said control method comprising the steps of:

forming, in said processing unit, a model simulating control characteristics of a plant indicating a control subject by a control apparatus of the plant;

storing, in said memory, control logic data including control parameters used for calculating the operation signal in a control logic database of the control apparatus;

storing, in said memory, operation end specification data of an operation end for controlling plant state quantity in an operation end specification database;

storing, in said memory, previous operation signals in an operation signal database;

storing, in said memory, previous measurement signals in a measurement signal database;

determining, by the processing unit, an initial value of a learning parameter by using data stored in a control logic database and an operation end specification database;

updating, by the processing unit, a learning parameter using data stored in the control logic database, the operation signal database and the measurement signal database;

setting, by the processing unit, a limit value of an operation signal range per unit time contained in the learning parameter to a constraint condition and using said model to simulate plant characteristics to learn a plant operation method; and storing, in said memory, learning information data indicating learned results in the learning information database, wherein an operation signal directing a control instruction applied to the plant is calculated using the measurement signal indicating the plant operation state quantity and the learning information data stored in the learning information database.

24. A plant control method according to claim 23, further comprising the steps of:

determining initial values of learning parameters using data stored in the control logic database including the measurement signals for measuring concentration of at least one of carbon monoxide, carbon dioxide, oxide sulfide and mercury, and the operation end specification database including data for determining at least one of an aperture of an air damper, an air flow rate and a fuel flow rate, determining learning parameters by updating the learning parameter based on the estimated result of whether or not the thermal electric power plant performs operation including at least one of burner switching operation, coal type switching operation and load changing operation using data stored in the control logic database, the operation signal database and the measurement signal database, or determining learning parameters by updating the learning parameter based on the estimated result regarding operation of the operation end using data stored in the operation signal database and the measurement signal database, learning a method of operating the thermal electric power plant by using a model which simulates characteristics of the thermal electric power plant by setting a limit value of an operation signal range per unit time included in the learning parameter to a learning constraint condition, learning information data indicating learned result is stored in the learning information database, and calculating an operation signal for the thermal electric power plant using the measurement signal indicating the plant operation quantity and the learning information data stored in the learning information database.

25. A plant control method according to claim 24, further comprising the steps of:

estimating learning information data obtained when the learning unit performs learning under a condition in which a limit value of an operation signal range per unit time included in learning parameters is set to a learning constraint condition using learning information data stored in the learning information database, and calculating the operation signals for thermal electric power plant using the added learning information data obtained as estimated results.

* * * * *